US008634370B2

(12) United States Patent
Yu et al.

(10) Patent No.: US 8,634,370 B2
(45) Date of Patent: *Jan. 21, 2014

(54) METHOD AND APPARATUS FOR TRANSMITTING AND RECEIVING AN UPLINK ACKNOWLEDGEMENT CHANNEL FOR A DOWNLINK DATA CHANNEL IN A MOBILE COMMUNICATION SYSTEM USING ORTHOGONAL FREQUENCY DIVISION MULTIPLE ACCESS

(75) Inventors: Jae Chon Yu, Suwon-si (KR); Jin Kyu Han, Seoul (KR); Ju Ho Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/489,117

(22) Filed: Jun. 5, 2012

(65) Prior Publication Data

US 2012/0243490 A1 Sep. 27, 2012

Related U.S. Application Data

(63) Continuation of application No. 12/535,943, filed on Aug. 5, 2009, now Pat. No. 8,218,520.

(30) Foreign Application Priority Data

Aug. 5, 2008 (KR) ........................ 10-2008-0076343

(51) Int. Cl.
*H04W 4/00* (2009.01)
(52) U.S. Cl.
USPC .......................................... 370/329; 370/341
(58) Field of Classification Search
USPC .......................................................... 370/329
See application file for complete search history.

(56) References Cited

U.S. PATENT DOCUMENTS 8,107,426 B2 * 1/2012 Cho et al. ...................... 370/329
8,155,070 B2 * 4/2012 Lee et al. ...................... 370/329

(Continued)

FOREIGN PATENT DOCUMENTS

WO WO 02/082666 10/2002
WO WO 2005/083965 9/2005

(Continued)

OTHER PUBLICATIONS

LG Electronics, "PUCCH ACK/NACK Configuration and CCE Index Mapping", R1-081003, 3GPP TSG RAN WG1#52, Feb. 15, 2008.

(Continued)

*Primary Examiner* — Kenny Lin
*Assistant Examiner* — Gerald Smarth
(74) *Attorney, Agent, or Firm* — The Farrell Law Firm, P.C.

(57) ABSTRACT

A communication apparatus and method of a mobile communication system. A method of transmitting an uplink acknowledge channel (ACKCH) for a downlink data channel in a mobile communication system includes: receiving a downlink control channel and a downlink data channel; generating uplink acknowledgement information for the received downlink data channel; assigning at least two channel resources for the uplink acknowledgement information; and transmitting the uplink ACKCH including the uplink acknowledgement information on the channel resources through at least two transmission antennas, wherein, the channel resources comprise a first channel resource and a second channel resource, the first channel resource for a first transmission antenna is assigned based on a lowest CCE index nCCE of the downlink control channel, and the second channel resource for a second transmission antenna is assigned based on a CCE index nCCE+1.

20 Claims, 18 Drawing Sheets

(56) References Cited

U.S. PATENT DOCUMENTS

| | | | |
|---|---|---|---|
| 2005/0113023 A1* | 5/2005 | Bassompiere et al. ......... | 455/20 |
| 2005/0201325 A1 | 9/2005 | Kang et al. | |
| 2005/0266799 A1 | 12/2005 | Hara et al. | |
| 2008/0013485 A1 | 1/2008 | Gorokhov et al. | |
| 2008/0080423 A1 | 4/2008 | Kolding et al. | |
| 2008/0316957 A1* | 12/2008 | Shen et al. ................... | 370/328 |
| 2009/0054006 A1 | 2/2009 | Cai et al. | |
| 2009/0097447 A1 | 4/2009 | Han et al. | |
| 2009/0168922 A1 | 7/2009 | Malladi et al. | |
| 2009/0303978 A1 | 12/2009 | Pajukoski et al. | |
| 2011/0280193 A1* | 11/2011 | Lindh et al. ................... | 370/329 |

FOREIGN PATENT DOCUMENTS

| WO | WO 2008/041819 | 4/2008 |
|---|---|---|
| WO | WO 2008/085000 | 7/2008 |
| WO | WO 2009/147133 | 12/2009 |

OTHER PUBLICATIONS

Samsung, "Schemes for Downlink ACK Channel Assignment in LTE Systems", R1-072243, 3GPP TSG RAN WG1 Meeting #49, May 12, 2007.

NTT DoCoMo et al., "Performance Enhancement Techniques for ACK/NACK in E-UTRA Uplink", R1-071651, 3GPP TSG RAN WG1 Meeting #48bis, Apr. 3, 2007.

Samsung, "LTE Downlink ACK Channel Mapping Linked to CCE", R1-073561, 3GPP TSG RAN WG1 Meeting #50, Aug. 15, 2007.

Samsung, "UL Transmit Diversity for PUCCH in LTE-A", R1-091883, 3GPP TSG RAN WG1 #57, Apr. 28, 2009.

Samsung, "Downlink ACK/NACK Transmit Diversity", R1-074483, 3GPP TSG RAN WG1 Meeting #50bis, Oct. 15, 2007.

* cited by examiner

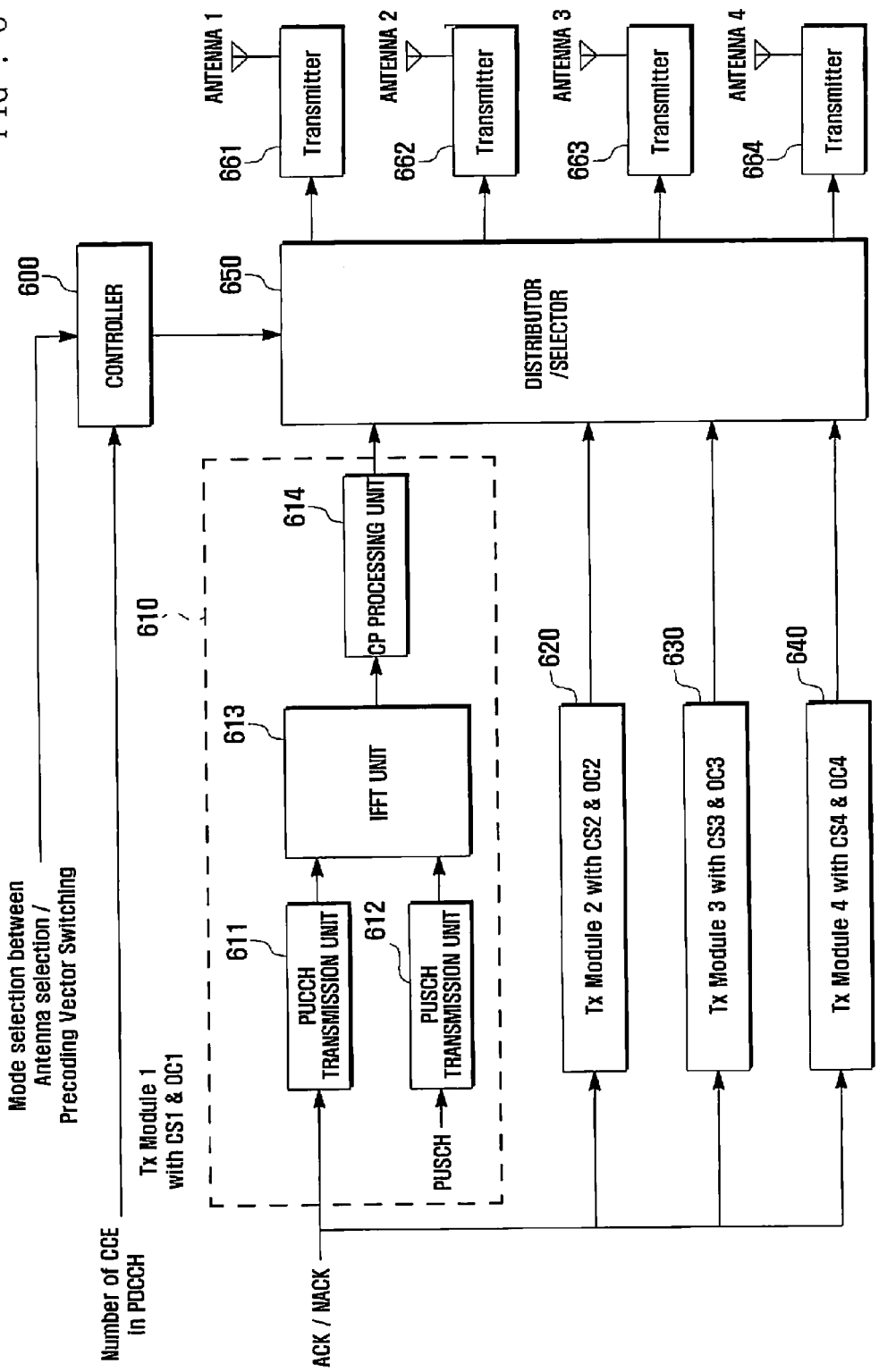

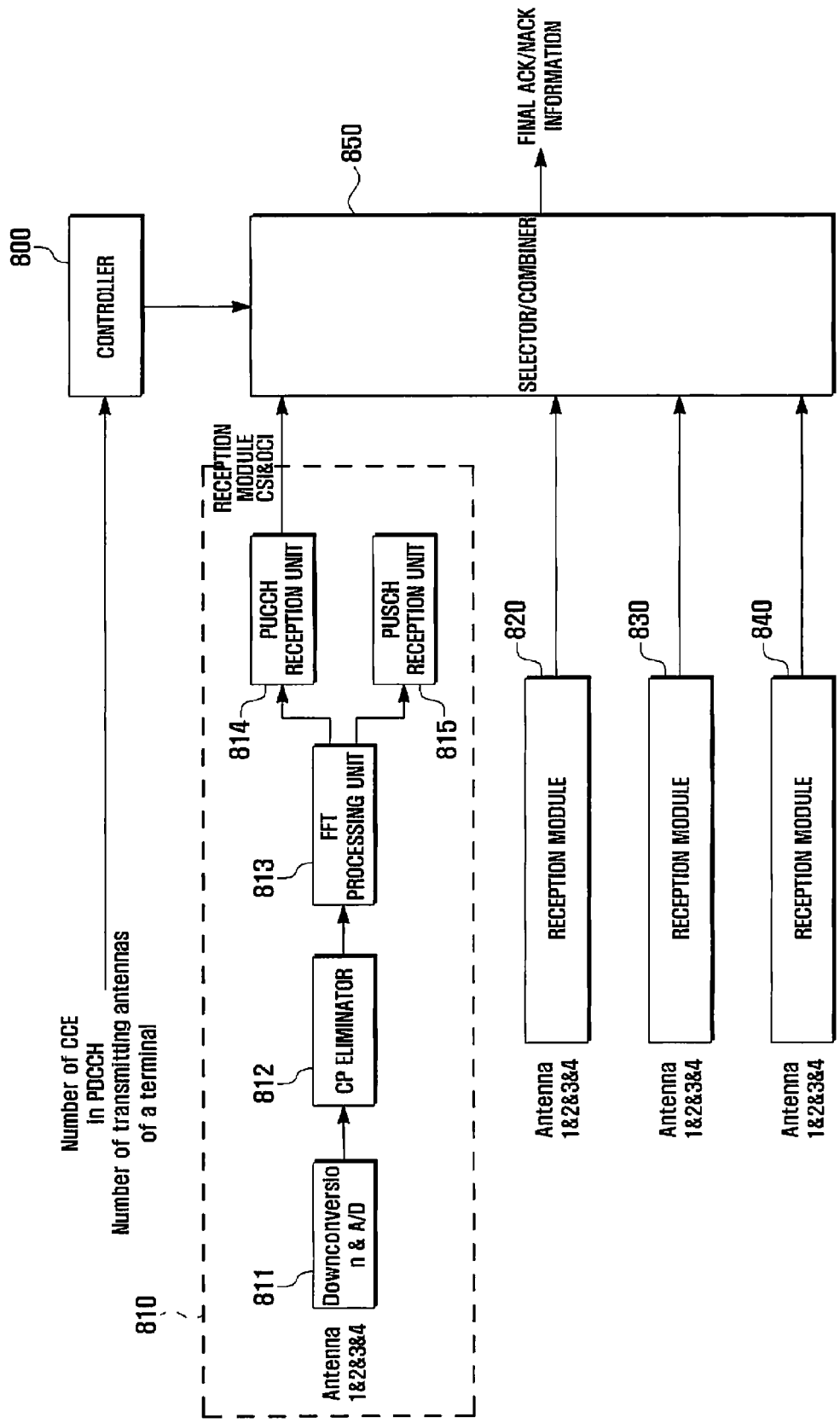

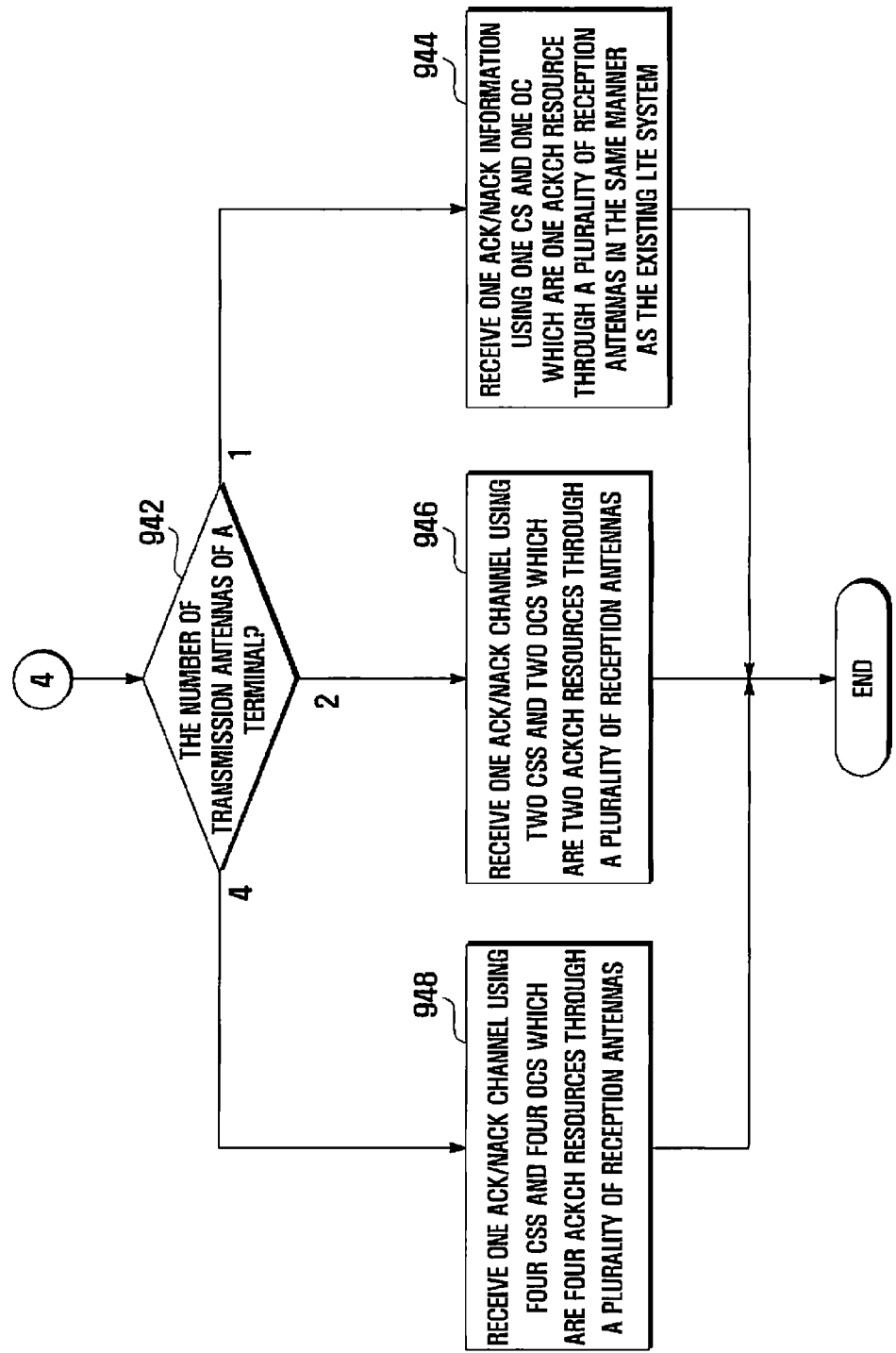

METHOD AND APPARATUS FOR TRANSMITTING AND RECEIVING AN UPLINK ACKNOWLEDGEMENT CHANNEL FOR A DOWNLINK DATA CHANNEL IN A MOBILE COMMUNICATION SYSTEM USING ORTHOGONAL FREQUENCY DIVISION MULTIPLE ACCESS

PRIORITY

This application is a Continuation of U.S. application Ser. No. 12/535,943, which was filed in the U.S. Patent and Trademark Office on Aug. 5, 2009, and claims priority under 35 U.S.C. §119(a) to Korean Patent Application Serial No. 10-2008-0076343, which was filed in the Korean Intellectual Property Office on Aug. 5, 2008, the entire disclosure of each of which is hereby incorporated by reference.

BACKGROUND OF THE INVENTION

1. Field of the Invention

The present invention relates generally to a communication apparatus and method of a mobile communication system using Orthogonal Frequency-Division Multiple Access (OFDMA), and more particularly, to a method and apparatus for transmitting and receiving an uplink acknowledgement channel for a downlink data channel.

2. Description of the Related Art

In general, in a mobile communication system, Hybrid Automatic Repeat request (HARQ) is an important technology used to increase the reliability of data transmission and the data throughput in a packed-based mobile communication system. HARQ refers to a technology obtained by combining the Automatic Repeat Request (ARQ) technology with the Forward Error Correction (FEC) technology.

FIG. 1 is a diagram illustrating an example of a typical HARQ. In FIG. 1, the horizontal axis is a time axis.

Referring to FIG. 1, in a mobile communication system, a base station transmits a plurality of data channels, and a terminal receives data by demodulating the data channels. Here, the base station can repeatedly transmit the same data or consecutively transmit different data through the data channels.

The base station performs an initial transmission operation 101 for a specific data channel. The terminal apparatus that receives the initial transmission data attempts to demodulate the data channel. In this process, the terminal performs a Cyclic Redundancy Check (CRC) for the data channel. If, as a result of the check, the initial transmission data is determined not to have been successfully demodulated, the terminal feedbacks Non-Acknowledgement (NACK) 102 to the base station. When the NACK 102 is received, the base station performs a first retransmission operation 103, as a retransmission for the initial transmission operation 101. Thus, the data channels in the initial transmission operation 101 and the first retransmission operation 103 transmit the same data. It should be noted that, although the data channels transmit the same data, they may include different redundancies.

It is assumed that the data transmission operations for the same information, that is, each of the transmission operations 101, 103, 105, or 107 for the same information is called a sub-packet. The terminal that receives the first retransmission 103 combines the received retransmitted data and the initially transmitted date the received in the initial transmission 101 in accordance with a predetermined rule, and attempts to demodulate the data channels based on the combined result.

When the data transmission is not successfully demodulated through CRC for the data channels in the above process, the terminal feedbacks a NACK 104 to the base station. The base station receives the NACK 104, and then performs a second retransmission operation 105, after a lapse of a given time from the first retransmission operation 103.

Thus, all the data channels for the initial transmission operation 101, the first retransmission operation 103, and the second retransmission operation 105 transmit the same information.

After the terminal receives the second retransmission data, the terminal performs combining with respect to the initial transmission data, the first retransmission data, and the second retransmission data in accordance with a predetermined rule, and demodulates the data channels based on the combining result.

As illustrated in FIG. 1, it is assumed that the data is successfully demodulated through CRC for the data channels, after the second retransmission 105.

Accordingly, after successful demodulation, the terminal feedbacks an ACK 106 to the data base station. The base station receives the ACK 106, and performs an initial transmission 107 for a sub-packet of a next data information. The initial transmission operation 107 can be performed immediately after the ACK 106 is received, or after a given time has elapsed, which results from a predetermined scheduling result.

As described above, in order to support HARQ, a terminal should transmit ACK/NACK feedbacks. A channel that transmits the ACK/NACK is called a response channel, or ACK CHannel (ACKCH).

FIG. 2 is a diagram illustrating a Physical Downlink Control CHannel (PDCCH) and a Physical Uplink Control CHannel (PUCCH) of a conventional mobile communication system.

Referring to FIG. 2, a base station configures PDCCHs 202 to 204 using at least one Control Channel Element (CCE) 201 to transmit. Here, a single PDCCH can use one, two, four, or eight CCEs 201. As illustrated in FIG. 2, each of the PDCCHs 202 to 204 can be used as a DownLink (DL) Grant. That is, the PDCCHs 202 to 204 can be used to allocate the resources of a Physical Downlink Shared CHannel (PDSCH) (i.e., a downlink data channel).

A terminal assigned with the resources of the PDSCH through the PDCCHs 202 to 204 transmits ACK/NACK information through channel resources for an ACKCH 206, which is mapped to the first CCE 201 of each PDCCH with respect to data transmitted through the allocated PDSCH resources. As an example of the above method, an ACKCH 1 is composed of channel resources called an ACKCH R1. Here, the channel resources refer to a Cyclic Shift (CS) and an Orthogonal Cover (OC) for configuring the ACKCH 206. The terminal can determine a CS and an OC, which are the resources of the ACKCH 206, using a channel index mapped to the CCE 201, as shown in Table 1 below.

TABLE 1

| Resource allocation: 18ACK/NACK channels with normal CP | | | | | | | |
|---|---|---|---|---|---|---|---|
| CELL SPECIFIC CYCLIC SHIFT OFFSET | | RS ORTHOGONAL COVER | | | ACK/NACK ORTHOGONAL COVER | | |
| $\delta_{offset}^{PUCCH} = 1$ | $\delta_{offset}^{PUCCH} = 0$ | $\bar{n}_{oc} = 0$ | $\bar{n}_{oc} = 1$ | $\bar{n}_{oc} = 2$ | $n_{oc} = 0$ | $n_{oc} = 1$ | $n_{oc} = 2$ |
| $n_{cs} = 1$ | $n_{cs} = 0$ | n' = 0 | | 12 | n' = 0 | | 12 |
| 2 | 1 | | 6 | | | 6 | |
| 3 | 2 | 1 | | 13 | 1 | | 13 |
| 4 | 3 | | 7 | | | 7 | |
| 5 | 4 | 2 | | 14 | 2 | | 14 |
| 6 | 5 | | 8 | | | 8 | |
| 7 | 6 | 3 | | 15 | 3 | | 15 |
| 8 | 7 | | 9 | | | 9 | |
| 9 | 8 | 4 | | 16 | 4 | | 16 |
| 10 | 9 | | 10 | | | 10 | |
| 11 | 10 | 5 | | 17 | 5 | | 17 |
| 0 | 11 | | 11 | | | 11 | |

Table 1 illustrates configurations of 18 ACKCHs in order to minimize interference of each sequence when a normal Cyclic Prefix (CP) is used. For example, when a channel index mapped to the CCE 201 is 5 and a preset $\delta_{offset}^{PUCCH}$ is 0, the terminal generates the ACKCH 206 using CS=10 and OC=0.

FIG. 3 is a diagram illustrating an ACKCH configuration using a CS and an OC, which are resources of an ACKCH corresponding to each index.

Referring to FIG. 3, as to the ACK/NACK information, a Computer-Generated (CG) sequence is generated using an allocated CS. The generated sequence is copied into four sequences. Each of the four copied sequences passes through Inverse Fast Fourier Transforms (IFFTs) 301, is multiplied by one bit of an OC by multipliers 302, and is then mapped 303 to each symbol of resource block allocated to a PUCCH. The mapped ACK/NACK symbol, together with uplink reference signal symbols, is hopped to each of slots within one subframe through one antenna, so that the same seven symbols are mapped.

The PDCCH includes one or several CCEs in order to transmit information having a different length according to the property of a DL grant and to increase the reliability of PDCCH depending on channel conditions by using a different number of CCEs according to channel conditions. However, assuming that channel resources are allocated to CCEs of PDCCH, respectively, when uplink ACK/NACK is transmitted, the channel resources should be allocated with the same number as CCEs. However, when the PDCCH includes several CCEs, the efficiency of resources decreases because only the first channel resource among uplink channel resources mapped to the CCEs is used and the remaining channel resources are not used.

SUMMARY OF THE INVENTION

The present invention has been designed in view of at least the above problems and provides a method and apparatus, which are capable of using uplink resources efficiently and using a plurality of antennas in a mobile communication system using Orthogonal Frequency-Division Multiple Access.

The present invention further provides a method and apparatus for transmitting an uplink ACKCH for a downlink data channel in a mobile communication system using Orthogonal Frequency-Division Multiple Access.

In accordance with an aspect of the present invention, a method of transmitting an uplink ACKnowledge CHannel (ACKCH) for a downlink data channel in a mobile communication system using Orthogonal Frequency-Division Multiple Access (OFDMA) includes: determining channel resources for each Control Channel Element (CCE), when a downlink control channel including at least two CCEs is received; generating uplink acknowledgement information by analyzing a received downlink data channel; assigning the CCEs to at least two transmission antennas in such a manner that the CCEs correspond to the transmission antennas; and transmitting the uplink ACKCH as the uplink acknowledgement information through the transmission antennas.

In accordance with another aspect of the present invention, a method of receiving an uplink ACKCH for a downlink data channel from a transmission apparatus in a mobile communication system using OFDMA includes: transmitting a downlink control channel including at least two CCEs; selecting reception antennas with a number corresponding to a number of CCEs and assigning the selected reception antennas to the channel resources in such a manner that the reception antennas correspond to the channel resources by CCE, when the number of CCEs is a number of transmission antennas of the transmission apparatus and less; and receiving the uplink ACKCH through the reception antennas.

In accordance with another aspect of the present invention, an apparatus for transmitting an uplink ACKCH for a downlink data channel in a mobile communication system using OFDMA includes: a transmission module that determines channel resources by CCE and generates uplink acknowledgement information by analyzing a received downlink data channel, when a downlink control channel including at least two CCEs is received; a plurality of transmission antennas that transmits the uplink acknowledgement information; and a controller that assigns the CCEs to at least two transmission antennas in such a manner that the CCEs correspond to the transmission antennas, and transmits the uplink ACKCH as the uplink acknowledgement information through the transmission antennas.

In accordance with another aspect of the present invention, an apparatus for receiving an uplink ACKCH for a downlink data channel from a transmission apparatus in a mobile communication system using OFDMA includes: a plurality of reception antennas that receives a downlink control channel including at least two CCEs and uplink acknowledgement information corresponding to the downlink data channel from at least two transmission antennas of the transmission apparatus; and a controller that selects the reception antennas with a number corresponding to a number of CCEs and assigns to correspond to the channel resources by CCE, and receives the uplink acknowledgement information from the uplink ACKCH through the reception antennas, when the number of CCEs is the number of transmission antennas or less.

BRIEF DESCRIPTION OF THE DRAWINGS

The above and other aspects, features, and advantages of the present invention will be more apparent from the following detailed description in conjunction with the accompanying drawings, in which:

FIG. 6 is a diagram illustrating a transmission apparatus for transmitting ACK/NACK information through a plurality of transmission antennas in a mobile communication system according to an embodiment of the present invention;

FIG. 8 is a diagram illustrating a reception apparatus for receiving ACK/NACK information in a mobile communication system according to an embodiment of the present invention; and FIGS. 9A to 9D are flowcharts illustrating methods of receiving ACK/NACK information according to the number of CCEs of PDCCH and the number of transmission antennas according to embodiments of the present invention.

DETAILED DESCRIPTION OF THE EMBODIMENTS OF THE PRESENT INVENTION

Embodiments of the present invention are described in detail below with reference to the accompanying drawings. The same reference numbers are used throughout the drawings to refer to the same or like parts. Further, detailed descriptions of well-known functions and structures incorporated herein may be omitted to avoid obscuring the subject matter of the present invention.

As described above, HARQ is an important technique for increasing the reliability of data transmission and the data throughput in a packed-based mobile communication system. Further, in order to support HARQ, a terminal should transmit ACK/NACK feedbacks. Herein, a channel that transmits the ACK/NACK information in the terminal will be referred to as an ACK CHannel (ACKCH).

Figure 4:
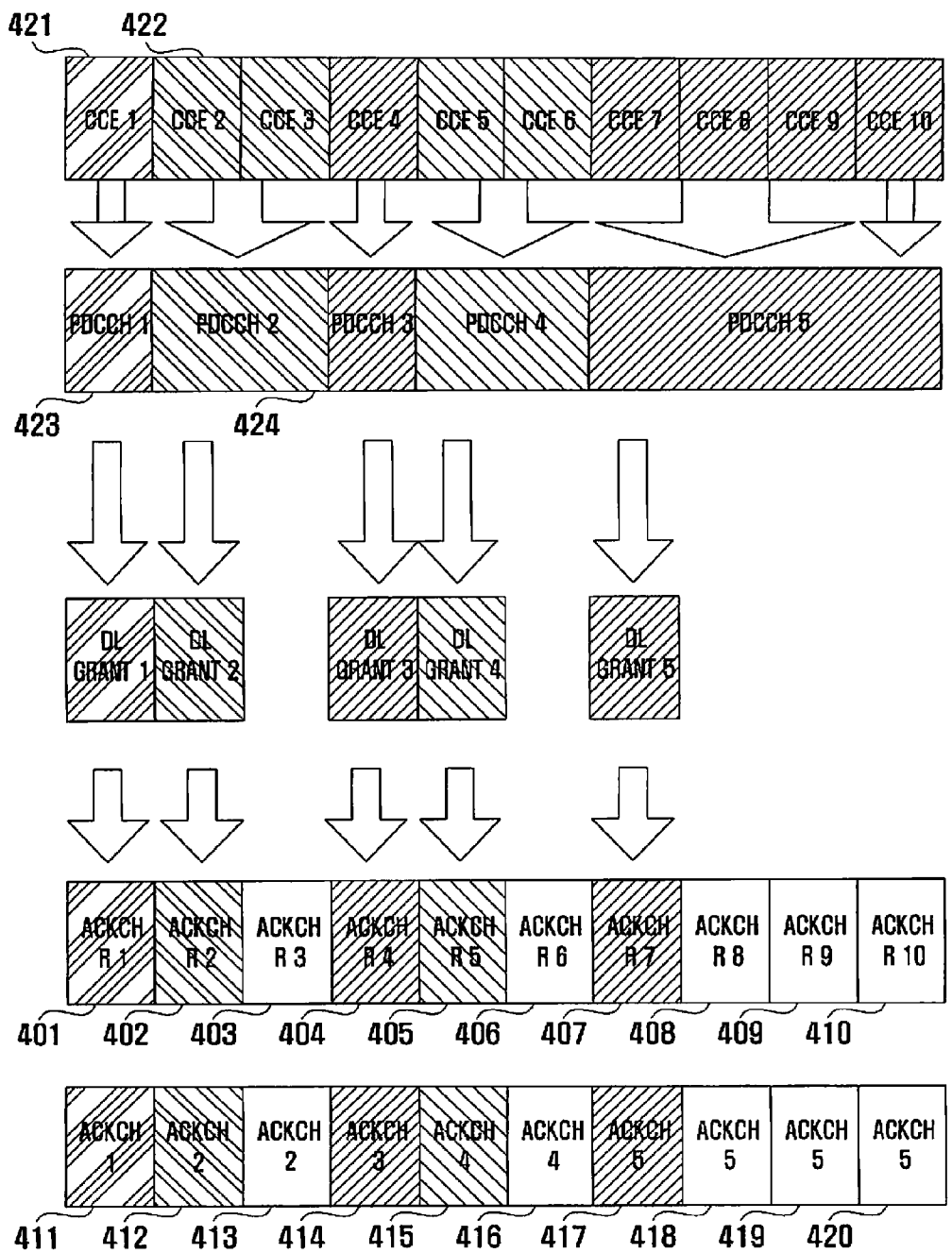
FIG. 4 is a diagram illustrating a method of transmitting a physical uplink acknowledge channel according to an embodiment of the present invention.

FIG. 4 is a diagram illustrating a method of transmitting a physical uplink ACKCH according to an embodiment of the present invention.

Referring to FIG. 4, a terminal transmits uplink acknowledgement information (i.e., ACK/NACK information) about a PDSCH to a base station through uplink ACKCHs, which are assigned based on the CCEs of the PDCCH according to an embodiment of the present invention. Here, the terminal can transmit the same ACKCHs to the base station in response to a specific PDSCH using a plurality of channel resources.

More specifically, the terminal transmits ACKCH1 to ACKCH5 411, 412, 414, 415, and 417 using respective channel resources, that is, ACKCH R1 401, ACKCH R2 402, ACKCH R4 404, ACKCH R5 405, and ACKCH R7 407, which are mapped to the first CCE of the PDCCH. When the PDCCH includes a plurality of CCEs, the terminal transmits ACKCH1 to ACKCH5 413, 416, 418, 419, and 420 using respective channel resources, that is, ACKCH R3 403, ACKCH R6 406, ACKCH R8 408, ACKCH R9 409, and ACKCH R10 410 which are mapped to CCEs except for the first CCE of the PDCCH. The terminal transmits the ACKCHs through a plurality of transmission antennas. In this case, the terminal assigns channel resources, which are different for every slot, to the respective transmission antennas in a plurality of the slots constituting the ACKCH, and then transmits the ACKCHs.

For example, since a PDCCH1 423 is composed of one CCE (i.e. CCE1 421), the terminal transmits the ACKCH1 411 for the PDSCH using the ACKCH R1 401, which are channel resources mapped to the CCE1 421. Here, the terminal transmits the ACKCH1 411 through one or more transmission antennas using only one channel resource. On the other hand, since a PDCCH2 424 includes two CCEs (i.e., a CCE2 and a CCE3 422), the terminal transmits the ACKCH2s 412 and 413 for the PDSCH using the ACKCH R2 402 and the ACKCH R3 403, which are respectively mapped to the CCE2 and the CCE3 422. Here, the terminal transmits ACKCH2s 412 and 413 through a plurality of transmission antennas using the two channel resources.

When the number of CCEs constituting the PUCCH is equal to or less than the number of the transmission antennas, the number of transmission antennas used corresponds to the number of CCEs to transmit the ACKCH.

FIGS. 5A to 5D are diagrams illustrating methods of transmitting ACK/NACK information according to a number of transmission antennas using CSs and OCs, which are channel resources set according to a number of CCEs constituting a PDCCH, according to embodiments of the present invention.

Figure 5A:
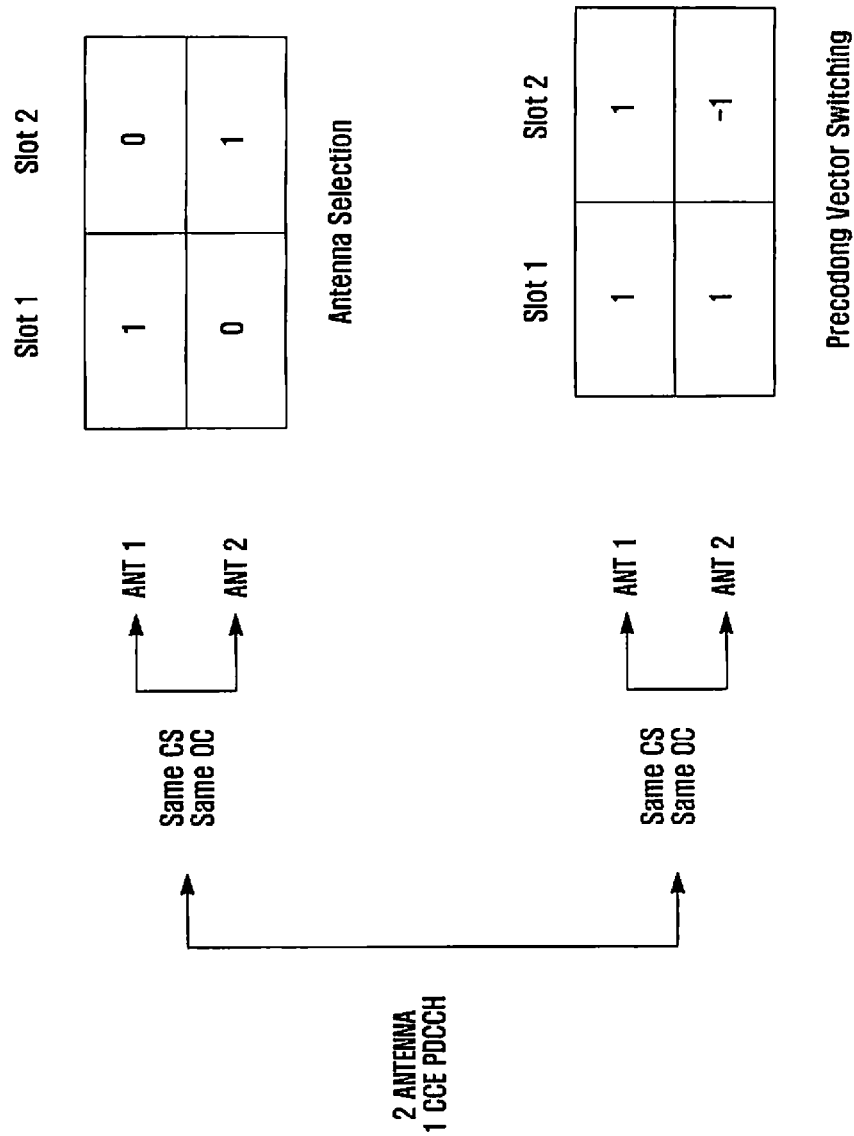
FIGS. 5A to 5D are diagrams illustrating methods of transmitting ACK/NACK information according to a number of transmission antennas using CSs and OCs, which are channel resources set according to a number of CCEs constituting a PDCCH according to embodiments of the present invention.

FIG. 5A is a diagram illustrating a method of transmitting ACK/NACK information from a terminal using one channel resource mapped to a PDCCH through two transmission antennas, while the PDCCH is composed of one CCE, according to an embodiment of the present invention.

Figure 1:
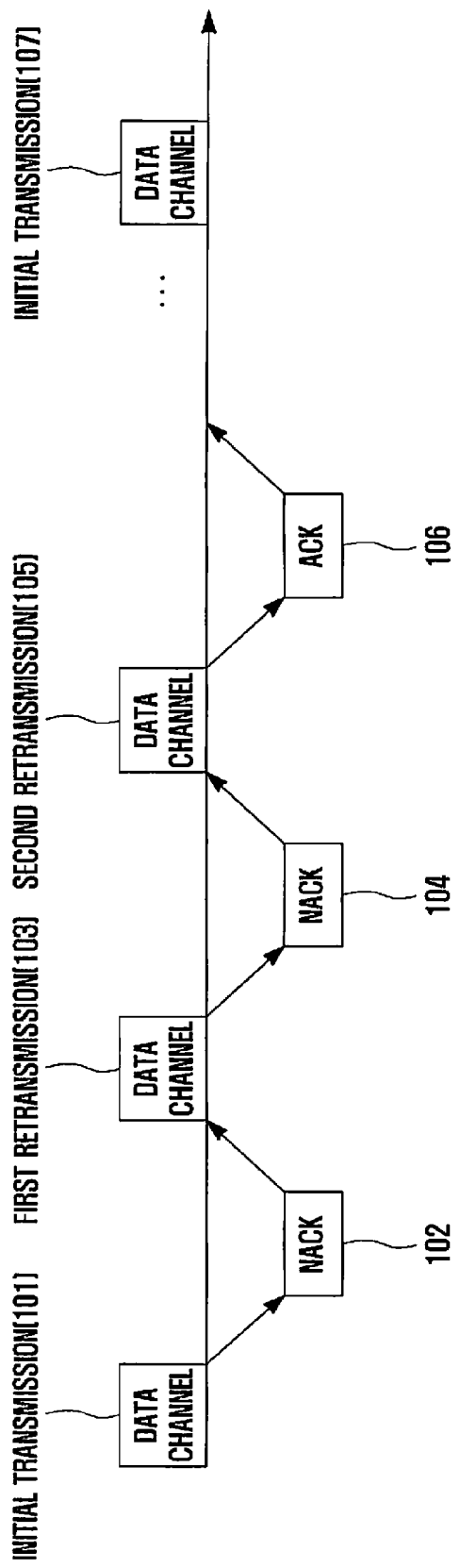
FIG. 1 is a diagram illustrating an example of a typical HARQ.
Figure 2:
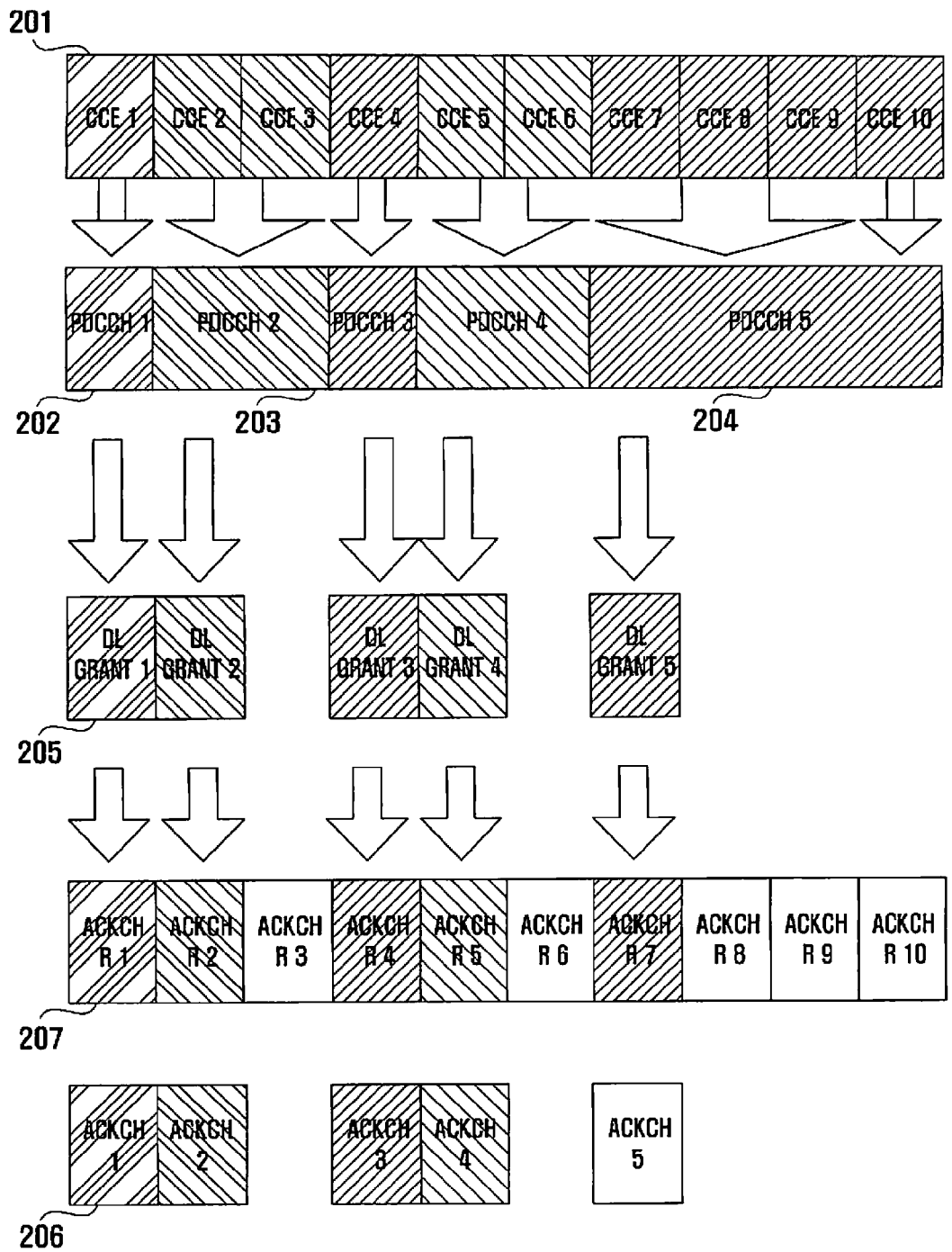
FIG. 2 is a diagram illustrating a Physical Downlink Control Channel and a Physical Uplink Control Channel of a mobile communication system.
Figure 3:
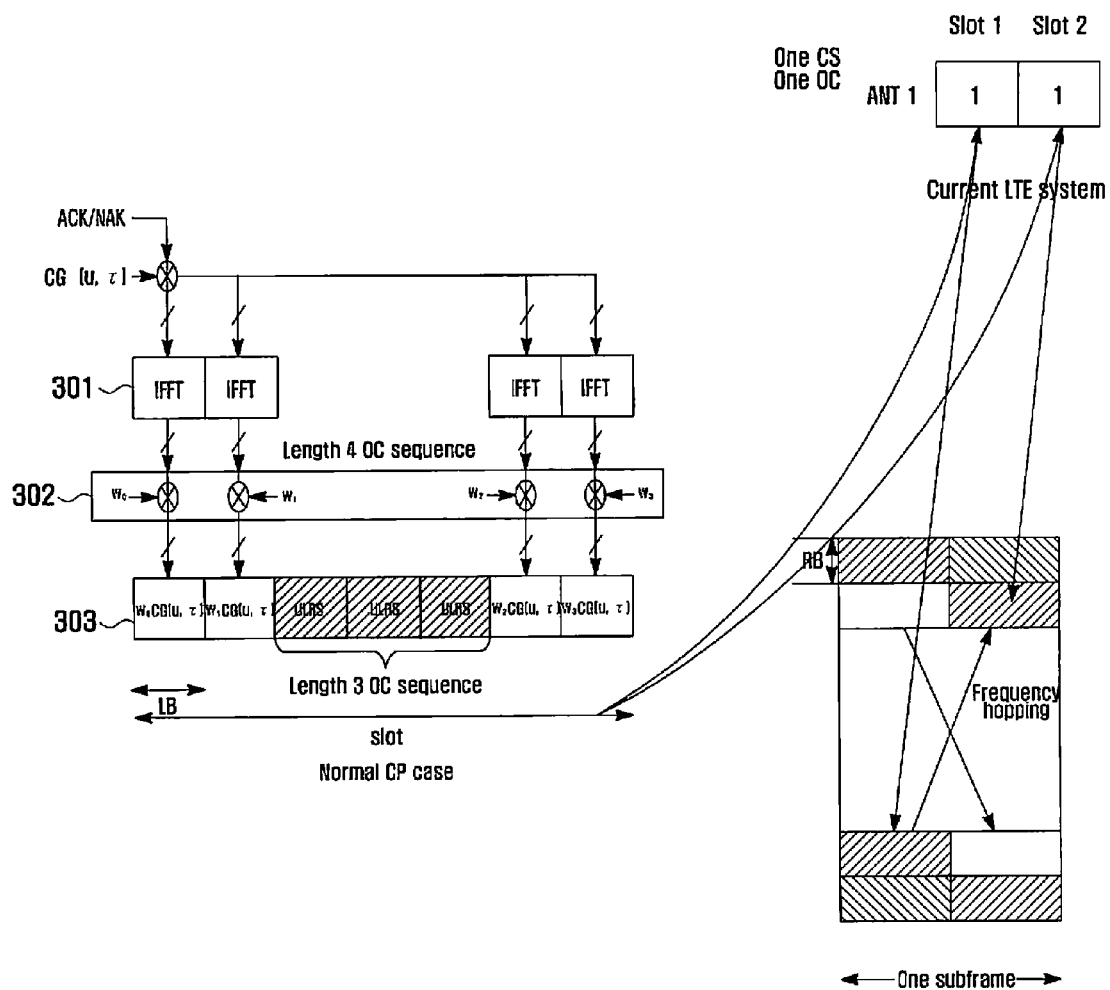
FIG. 3 is a diagram illustrating an ACKCH configuration using a CS and an OC, which are resources of an ACKCH corresponding to each index.

Referring to FIG. 5A, one ACK/NACK information is processed using one CS and one OC, which are one channel resource as illustrated in FIG. 3, and is then, as a first example, transmitted through two transmission antennas using an antenna selection method that transmits the same information to a first antenna in a slot 1 and to a second antenna in a slot 2.

As a second example, data can be transmitted using a Precoding Vector Switching (PVS) method, wherein the same information is transmitted through two slots, while the same information is transmitted after multiplying [1·1] in the first antenna and after multiplying [1·−1] in the second antenna. Accordingly, the same information is transmitted while maintaining orthogonality.

Figure 5B:
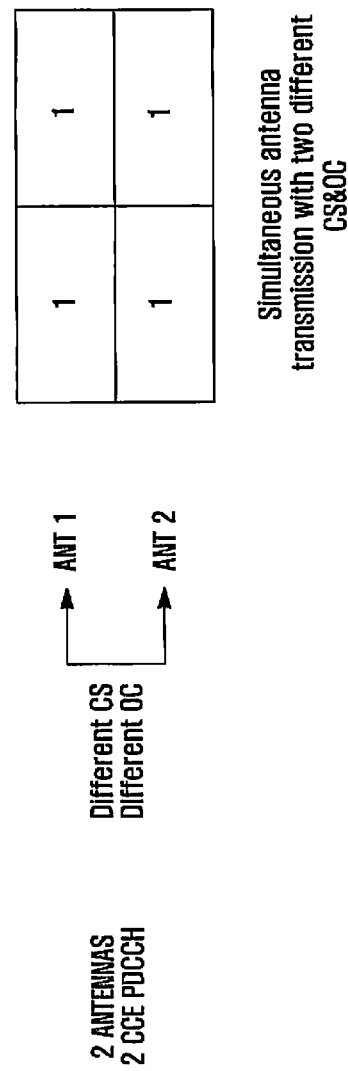

FIG. 5B is a diagram illustrating a method of transmitting ACK/NACK information of terminal using two transmission antennas while a PDCCH is composed of two CCEs, according to an embodiment of the present invention.

Referring to FIG. 5B, the same ACK/NACK information is processed into a signal to be transmitted respectively using two CSs and two OCs, which are channel resources mapped to two CCEs, and is then repeatedly transmitted through a slot 1 and a slot 2 through each of the two transmission antennas. That is, the ACK/NACK information using the first channel resource is transmitted through the first antenna, while the ACK/NACK information using the second channel resource is transmitted through the second antenna.

Figure 5C:
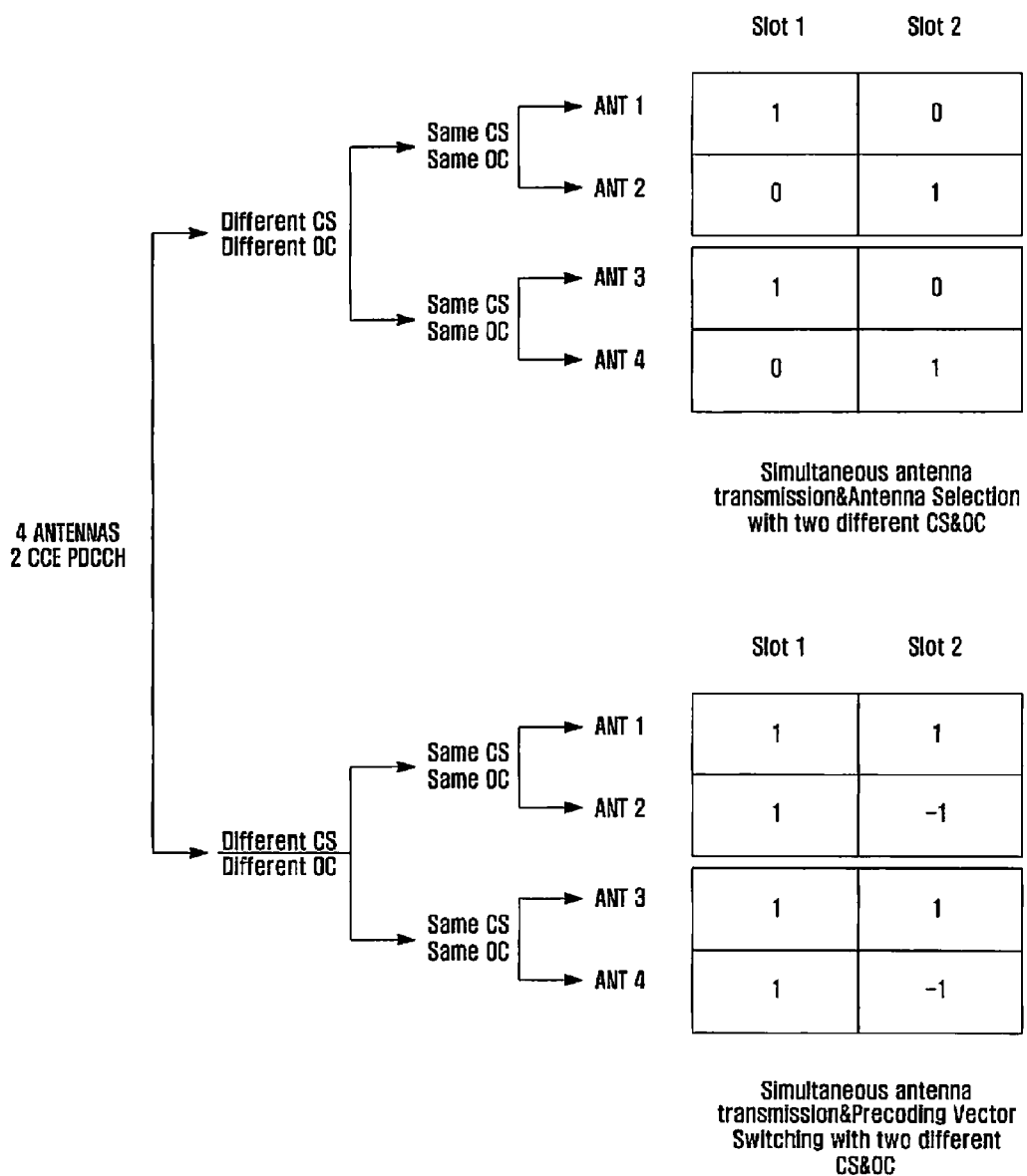

FIG. 5C is a diagram illustrating a method of transmitting ACK/NACK information of terminal using four transmission antennas while a PDCCH is composed of two CCEs, according to an embodiment of the present invention.

Referring to FIG. 5C, in ACK/NACK information generated using two channel resources, one ACK/NACK information is transmitted through two transmission antennas. One ACK/NACK information is transmitted through two transmission antennas using the antenna selection method or the PVS method in the same manner as illustrated in FIG. 5A. That is, the ACK/NACK information is processed into signals using two channel resources and is then transmitted through antennas 1&2 and 3&4 using the antenna selection method or the PVS method.

Figure 5D:
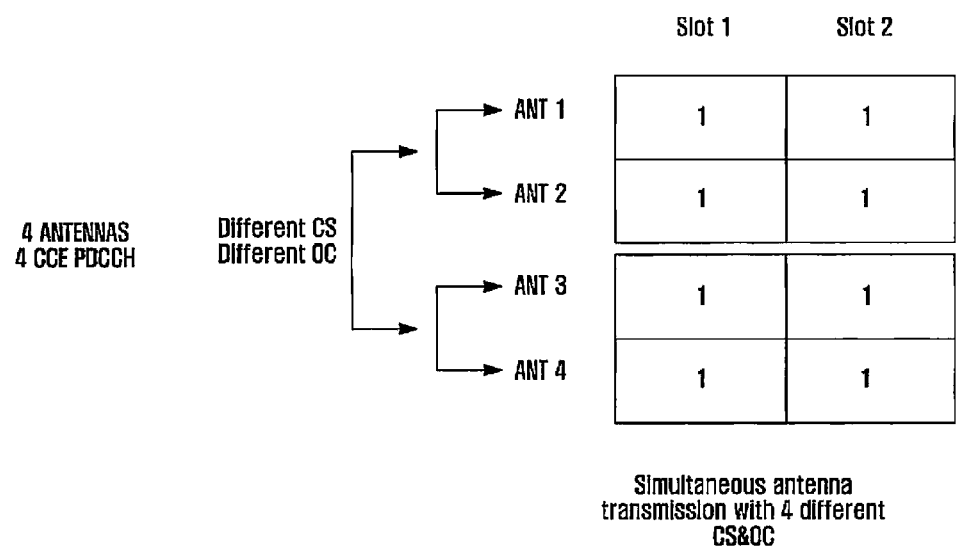

FIG. 5D is a diagram illustrating a method of transmitting ACK/NACK information of terminal using four antennas while a PDCCH is composed of four CCEs, according to an embodiment of the present invention. More specifically, the ACK/NACK information is transmitted through each of the transmission antennas using four channel resources.

When the number of CCEs constituting the PUCCH exceeds the number of transmission antennas, the ACKCH is transmitted using the same number of CCEs corresponding to the available number of transmission antennas. Otherwise, the ACKCH is transmitted using the as many CCEs as half of the number of available transmission antennas. At this time, the ACKCH can be transmitted with the PVS method using the channel resource of one CCE for two transmission antennas.

Table 2 indicates that a terminal transmits the ACKCH information through two or four transmission antennas with the PVS method using four channel resources, while a PDDCH includes four CCES. A first selection can be performed using a third and a fourth channel resource and six selection methods can be used with the same method. That is, the following Table 2 indicates a scenario in which only two channel resources are used among four channel resources.

TABLE 2

| example of selection | channel resource 1 | channel resource 2 | channel resource 3 | channel resource 4 |
|---|---|---|---|---|
| 1 | 0 | 0 | 1 | 1 |
| 2 | 0 | 1 | 0 | 1 |
| 3 | 0 | 1 | 1 | 0 |
| 4 | 1 | 0 | 0 | 1 |
| 5 | 1 | 0 | 1 | 0 |
| 6 | 1 | 1 | 0 | 0 |

Table 3 indicates that a terminal transmits the ACKCH information through two or four transmission antennas with the PVS method using eight channel resources, while a PDDCH includes eight CCES. A first selection can be performed using a seventh and an eighth channel resource, while twenty-eight selection methods can be used with the same method. That is, the following Table 3 indicates a scenario in which only two channel resources are used among eight channel resources.

TABLE 3

| example of selection | channel resource 1 | channel resource 2 | channel resource 3 | channel resource 4 | channel resource 5 | channel resource 6 | channel resource 7 | channel resource 8 |
|---|---|---|---|---|---|---|---|---|
| 1 | 0 | 0 | 0 | 0 | 0 | 0 | 1 | 1 |
| 2 | 0 | 0 | 0 | 0 | 0 | 1 | 0 | 1 |
| 3 | 0 | 0 | 0 | 0 | 0 | 1 | 1 | 0 |
| 4 | 0 | 0 | 0 | 0 | 1 | 0 | 0 | 1 |
| 5 | 0 | 0 | 0 | 0 | 1 | 0 | 1 | 0 |
| 6 | 0 | 0 | 0 | 0 | 1 | 1 | 0 | 0 |
| 7 | 0 | 0 | 0 | 1 | 0 | 0 | 0 | 1 |
| 8 | 0 | 0 | 0 | 1 | 0 | 0 | 1 | 0 |
| 9 | 0 | 0 | 0 | 1 | 0 | 1 | 0 | 0 |
| 10 | 0 | 0 | 0 | 1 | 1 | 0 | 0 | 0 |
| 11 | 0 | 0 | 1 | 0 | 0 | 0 | 0 | 1 |
| 12 | 0 | 0 | 1 | 0 | 0 | 0 | 1 | 0 |
| 13 | 0 | 0 | 1 | 0 | 0 | 1 | 0 | 0 |
| 14 | 0 | 0 | 1 | 0 | 1 | 0 | 0 | 0 |
| 15 | 0 | 0 | 1 | 1 | 0 | 0 | 0 | 0 |
| 16 | 0 | 1 | 0 | 0 | 0 | 0 | 0 | 1 |
| 17 | 0 | 1 | 0 | 0 | 0 | 0 | 1 | 0 |
| 18 | 0 | 1 | 0 | 0 | 0 | 1 | 0 | 0 |
| 19 | 0 | 1 | 0 | 0 | 1 | 0 | 0 | 0 |
| 20 | 0 | 1 | 0 | 1 | 0 | 0 | 0 | 0 |
| 21 | 0 | 1 | 1 | 0 | 0 | 0 | 0 | 0 |
| 22 | 1 | 0 | 0 | 0 | 0 | 0 | 0 | 1 |
| 23 | 1 | 0 | 0 | 0 | 0 | 0 | 1 | 0 |
| 24 | 1 | 0 | 0 | 0 | 0 | 1 | 0 | 0 |
| 25 | 1 | 0 | 0 | 0 | 1 | 0 | 0 | 0 |
| 26 | 1 | 0 | 0 | 1 | 0 | 0 | 0 | 0 |
| 27 | 1 | 0 | 1 | 0 | 0 | 0 | 0 | 0 |
| 28 | 1 | 1 | 0 | 0 | 0 | 0 | 0 | 0 |

Table 4 indicates that a terminal transmits the ACKCH information through four or eight channel resources using eight channel resources, while a PDDCH includes eight CCES. A first selection can be performed using a fifth, a sixth, a seventh, and an eighth channel resource, and seventy selection methods can be used with the same method. That is, the following Table 4 indicates a scenario in which only four channel resources are used among eight channel resources.

TABLE 4

| example of selection | channel resource 1 | channel resource 2 | channel resource 3 | channel resource 4 | channel resource 5 | channel resource 6 | channel resource 7 | channel resource 8 |
|---|---|---|---|---|---|---|---|---|
| 1 | 0 | 0 | 0 | 0 | 1 | 1 | 1 | 1 |
| 2 | 0 | 0 | 0 | 1 | 0 | 1 | 1 | 1 |
| 3 | 0 | 0 | 0 | 1 | 1 | 0 | 1 | 1 |
| 4 | 0 | 0 | 0 | 1 | 1 | 1 | 0 | 1 |
| 5 | 0 | 0 | 0 | 1 | 1 | 1 | 1 | 0 |
| 6 | 0 | 0 | 1 | 0 | 0 | 1 | 1 | 1 |
| 7 | 0 | 0 | 1 | 0 | 1 | 0 | 1 | 1 |
| 8 | 0 | 0 | 1 | 0 | 1 | 1 | 0 | 1 |
| 9 | 0 | 0 | 1 | 0 | 1 | 1 | 1 | 0 |
| 10 | 0 | 0 | 1 | 1 | 0 | 0 | 1 | 1 |
| 11 | 0 | 0 | 1 | 1 | 0 | 1 | 0 | 1 |
| 12 | 0 | 0 | 1 | 1 | 0 | 1 | 1 | 0 |
| 13 | 0 | 0 | 1 | 1 | 1 | 0 | 0 | 1 |
| 14 | 0 | 0 | 1 | 1 | 1 | 0 | 1 | 0 |
| 15 | 0 | 0 | 1 | 1 | 1 | 1 | 0 | 0 |
| 16 | 0 | 1 | 0 | 0 | 0 | 1 | 1 | 1 |
| 17 | 0 | 1 | 0 | 0 | 1 | 0 | 1 | 1 |
| 18 | 0 | 1 | 0 | 0 | 1 | 1 | 0 | 1 |
| 19 | 0 | 1 | 0 | 0 | 1 | 1 | 1 | 0 |
| 20 | 0 | 1 | 0 | 1 | 0 | 0 | 1 | 1 |
| 21 | 0 | 1 | 0 | 1 | 0 | 1 | 0 | 1 |
| 22 | 0 | 1 | 0 | 1 | 0 | 1 | 1 | 0 |
| 23 | 0 | 1 | 0 | 1 | 1 | 0 | 0 | 1 |
| 24 | 0 | 1 | 0 | 1 | 1 | 0 | 1 | 0 |
| 25 | 0 | 1 | 0 | 1 | 1 | 1 | 0 | 0 |
| 26 | 0 | 1 | 1 | 0 | 0 | 0 | 1 | 1 |
| 27 | 0 | 1 | 1 | 0 | 0 | 1 | 0 | 1 |
| 28 | 0 | 1 | 1 | 0 | 0 | 1 | 1 | 0 |
| 29 | 0 | 1 | 1 | 0 | 1 | 0 | 0 | 1 |
| 30 | 0 | 1 | 1 | 0 | 1 | 0 | 1 | 0 |
| 31 | 0 | 1 | 1 | 0 | 1 | 1 | 0 | 0 |
| 32 | 0 | 1 | 1 | 1 | 0 | 0 | 0 | 1 |
| 33 | 0 | 1 | 1 | 1 | 0 | 0 | 1 | 0 |
| 34 | 0 | 1 | 1 | 1 | 0 | 1 | 0 | 0 |
| 35 | 0 | 1 | 1 | 1 | 1 | 0 | 0 | 0 |
| 36 | 1 | 0 | 0 | 0 | 0 | 1 | 1 | 1 |
| 37 | 1 | 0 | 0 | 0 | 1 | 0 | 1 | 1 |
| 38 | 1 | 0 | 0 | 0 | 1 | 1 | 0 | 1 |
| 39 | 1 | 0 | 0 | 0 | 1 | 1 | 1 | 0 |
| 40 | 1 | 0 | 0 | 1 | 0 | 0 | 1 | 1 |
| 41 | 1 | 0 | 0 | 1 | 0 | 1 | 0 | 1 |
| 42 | 1 | 0 | 0 | 1 | 0 | 1 | 1 | 0 |
| 43 | 1 | 0 | 0 | 1 | 1 | 0 | 0 | 1 |
| 44 | 1 | 0 | 0 | 1 | 1 | 0 | 1 | 0 |
| 45 | 1 | 0 | 0 | 1 | 1 | 1 | 0 | 0 |
| 46 | 1 | 0 | 1 | 0 | 0 | 0 | 1 | 1 |
| 47 | 1 | 0 | 1 | 0 | 0 | 1 | 0 | 1 |
| 48 | 1 | 0 | 1 | 0 | 0 | 1 | 1 | 0 |
| 49 | 1 | 0 | 1 | 0 | 1 | 0 | 0 | 1 |
| 50 | 1 | 0 | 1 | 0 | 1 | 0 | 1 | 0 |
| 51 | 1 | 0 | 1 | 0 | 1 | 1 | 0 | 0 |
| 52 | 1 | 0 | 1 | 1 | 0 | 0 | 0 | 1 |
| 53 | 1 | 0 | 1 | 1 | 0 | 0 | 1 | 0 |
| 54 | 1 | 0 | 1 | 1 | 0 | 1 | 0 | 0 |
| 55 | 1 | 0 | 1 | 1 | 1 | 0 | 0 | 0 |
| 56 | 1 | 1 | 0 | 0 | 0 | 0 | 1 | 1 |
| 57 | 1 | 1 | 0 | 0 | 0 | 1 | 0 | 1 |
| 58 | 1 | 1 | 0 | 0 | 0 | 1 | 1 | 0 |
| 59 | 1 | 1 | 0 | 0 | 1 | 0 | 0 | 1 |
| 60 | 1 | 1 | 0 | 0 | 1 | 0 | 1 | 0 |
| 61 | 1 | 1 | 0 | 0 | 1 | 1 | 0 | 0 |
| 62 | 1 | 1 | 0 | 1 | 0 | 0 | 0 | 1 |
| 63 | 1 | 1 | 0 | 1 | 0 | 0 | 1 | 0 |
| 64 | 1 | 1 | 0 | 1 | 0 | 1 | 0 | 0 |
| 65 | 1 | 1 | 0 | 1 | 1 | 0 | 0 | 0 |
| 66 | 1 | 1 | 1 | 0 | 0 | 0 | 0 | 1 |

TABLE 4-continued

| example of selection | channel resource 1 | channel resource 2 | channel resource 3 | channel resource 4 | channel resource 5 | channel resource 6 | channel resource 7 | channel resource 8 |
|---|---|---|---|---|---|---|---|---|
| 67 | 1 | 1 | 1 | 0 | 0 | 0 | 1 | 0 |
| 68 | 1 | 1 | 1 | 0 | 0 | 1 | 0 | 0 |
| 69 | 1 | 1 | 1 | 0 | 1 | 0 | 0 | 0 |
| 70 | 1 | 1 | 1 | 1 | 0 | 0 | 0 | 0 |

FIG. 6 is a diagram illustrating a transmission apparatus for transmitting ACK/NACK information through a plurality of transmission antennas in a mobile communication system according to an embodiment of the present invention.

Referring to FIG. 6, the transmission apparatus includes a plurality of transmission modules 610, 620, 630, and 640, a controller 600, a distributor/selector 650, and a plurality of transmitters 661, 662, 663, and 664.

Each of the transmission modules 610, 620, 630, and 640 determines channel resources using the CCE of PDCCH, i.e., the CS and the OC, generates uplink acknowledgement information (i.e., ACK/NACK information) based on an analysis result of the PDSCH, and performs processing using the CS and the OC.

The first transmission module 610 includes a PUCCH transmission unit 611, a PUSCH transmission unit 612, an IFFT unit 613, and a CP processing unit 614. The PUCCH transmission unit 611 processes received ACK/NACK information using one CS and one OC. The PUSCH transmission unit 612 processes generated PUSCH data. The IFFT unit 613 performs IFFT on the PUCCH and the PUSCH data, and the CP processing unit 614 adds a CP to the output of the IFFT unit 613.

The second transmission module 620 to the fourth transmission module 640 have the same configuration as the first transmission module 610, and are configured to process the respective data of transmission modules using the same method as the first transmission module 610. Accordingly, a description of these transmission modules will not be repeated.

The controller 600 controls an operation for selecting and distributing the outputs of the first transmission module 610 to fourth transmission module 640 according to the number of CCEs of a PDCCH and an input signal for mode selection signal (mode selection between antenna selection/precoding vector switching. Here, the controller 600 compares the number of CCEs with the number of transmission antennas, and selects and distributes the outputs of the first transmission module 610 to fourth transmission module 640 based on the comparison result.

The distributor/selector 650 receives the outputs of the first transmission module 610 to fourth transmission module 640, and distributes and selects the outputs of the first transmission module 610 to fourth transmission module 640 under the control of the controller 600. Here, the distributor/selector 650 assigns different channel resources to respective transmission antennas. For example, when the number of CCEs is identical to the number of transmission antennas, the distributor/selector 650 assigns channel resources to the transmission antennas on a one-to-one basis. However, when the number of CCEs exceeds the number of transmission antennas, the distributor/selector 650 selects as many channel resources as there transmission antennas, and assigns the channel resources to the respective transmission antennas. Furthermore, when the number of CCEs is less than the number of transmission antennas, the distributor/selector 650 selects the a transmission antenna for each of the CCEs, and assigns the channel resources to the respective transmission antennas. Further, the distributor/selector 650 transmits the ACK/NACK information through at least any one of transmission antennas.

Each of the transmitters 661 to 664 includes a transmission antenna (Antenna 1 to a Antenna 4, respectively) and transforms a transmission signal of baseband output from the distributor/selector 650 into a RF signal and outputs the transformed signal through a corresponding transmission antenna.

As described above, after one ACK/NACK information is processed using one CS and one OC in the PUCCH transmission unit 611 of the transmission modules 610, 620, 630, and 640, IFFT and the CP addition are performed along with the output of the PUSCH transmission unit 612. The above processes are processed in the transmission modules 610, 620, 630, and 640 that use one CS and one OC, while these transmission modules 610, 620, 630, and 640 are implemented as many as the number of CCEs used in a PDCCH.

Further, each of the transmission modules 610, 620, 630, and 640 generates signals to be transmitted to each of the transmission antennas through the distributor/selector 650 by using the number of CCEs constituting a PDCCH and a signal generated in the controller 600 that operates according to the antenna selection method or the PVS method, and transmits the signal through each transmission antennas.

FIGS. 7A to 7D are flowcharts illustrating methods of a transmission apparatus transmitting ACK/NACK information according to a number of transmission antennas and a number of CCEs included in a PDCCH, according to embodiments of the present invention.

Figure 7A:
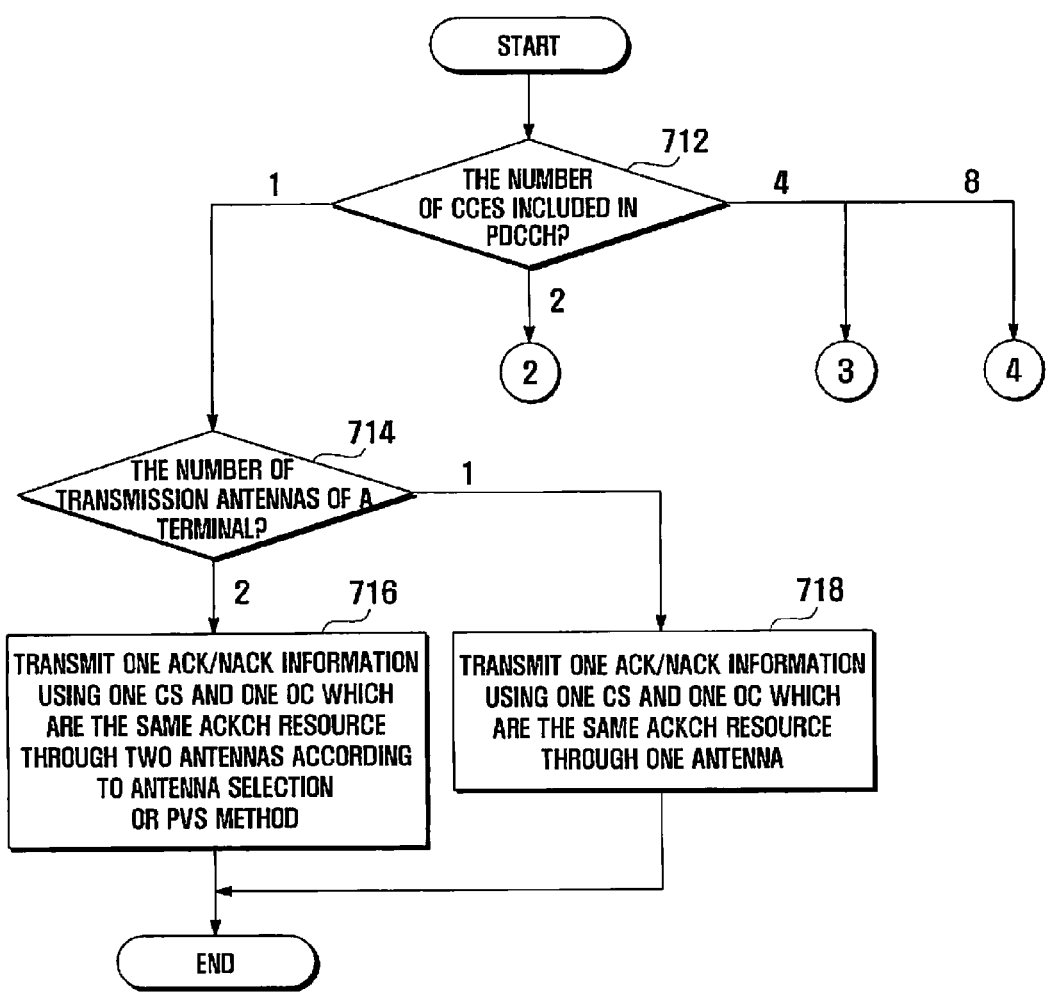
FIGS. 7A to 7D are flowcharts illustrating methods of transmitting ACK/NACK information according to the number of CCEs of PDCCH and the number of transmission antennas according to embodiments of the present invention.
Figure 7B:
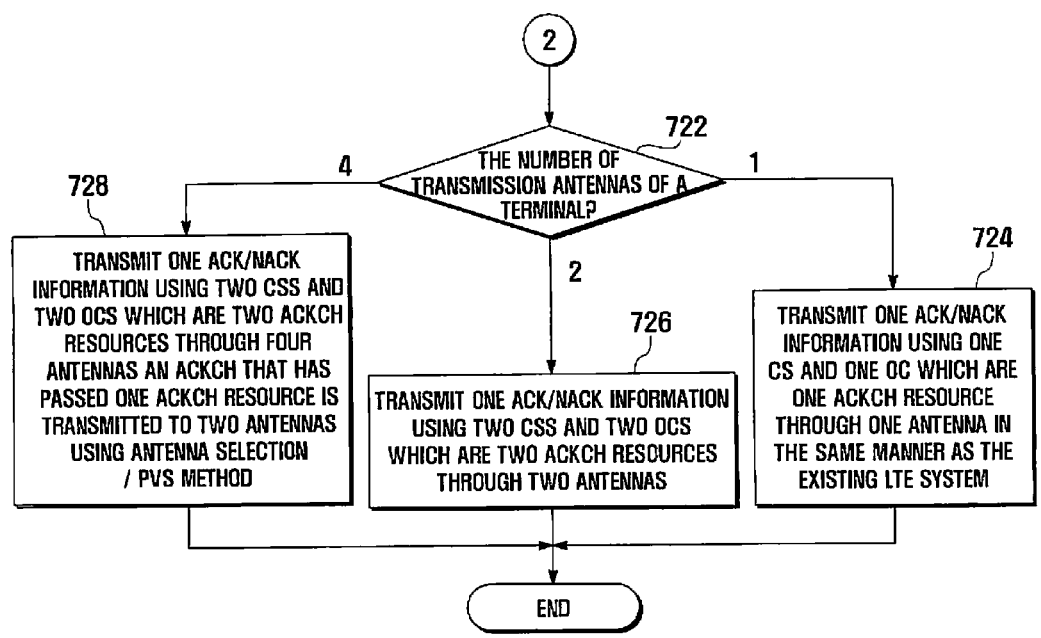
Figure 7C:
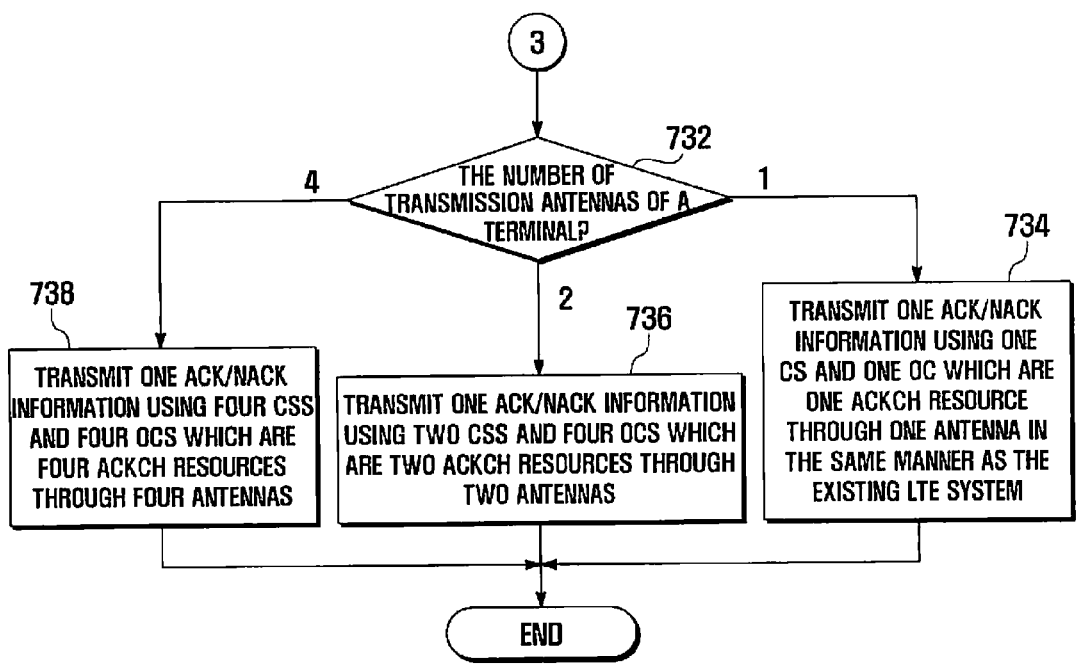
Figure 7D:
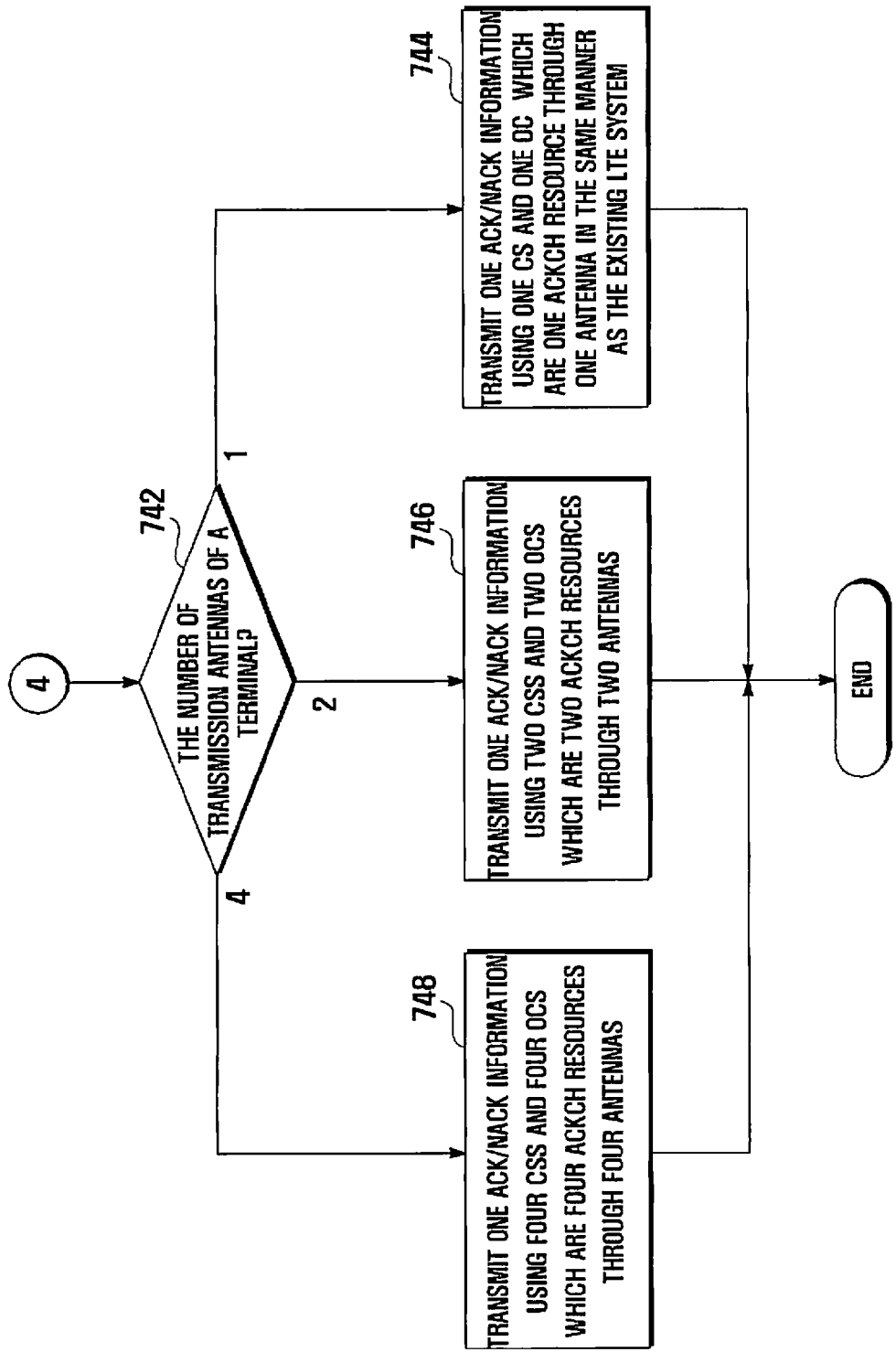

In FIGS. 7A to 7D, the transmission apparatus checks the number of CCEs included in the PDCCH and performs a pertinent procedure according to the number of CCEs. When there is 1 CCE, the transmission apparatus performs a procedure as illustrated in FIG. 7A. When there are 2 CCEs, the transmission apparatus performs a procedure as illustrated in FIG. 7B. When there are 4 CCEs, the transmission apparatus performs a procedure as illustrated in FIG. 7C. When there are 8 CCEs, the transmission apparatus performs a procedure as illustrated in FIG. 7d.

Referring to FIG. 7A, the transmission apparatus checks a number of CCEs included in a PDCCH in step 712. When the number of CCEs is one, the terminal (i.e., the transmission apparatus) checks a number of transmission antennas in step 714. When the number of transmission antennas is one, the terminal transmits one ACK/NACK information using one CS and one OC, which are the same channel resources, through a single transmission antenna in step 718. However, if the number of transmission antennas is two, the terminal transmits one ACK/NACK information using one CS and one OC, which are the same channel resources, through two transmission antennas according to the antenna selection method/ the PVS method in step 716.

As illustrated in FIG. 7A, the terminal performs a different ACK/NACK transmission method based on the number of transmission antennas to be transmitted. When a single transmission antenna can be used, the terminal transmits one ACK/NACK information using one CS and one OC through a single transmission antenna. However, when two transmission antennas are supported, the terminal transmits one ACK/NACK information using one CS and one OC through the two transmission antennas, according to the antenna selection method or the PVS method.

FIG. 7B is a flowchart of transmitting ACK/NACK information of terminal having one, two, or four transmission antennas, wherein the PDCCH includes two CCEs, according to an embodiment of the present invention.

Referring to FIG. 7B, if the number of CCEs included in the PDCCH is determined to be two at step 712 of FIG. 7A, the terminal checks the number of transmission antennas in step 722. When there is one transmission antenna, the transmission apparatus transmits one ACK/NACK information using one CS and one OC, which are a single channel resource, through the one transmission antenna in the same manner as the existing LTE system in step 724. For example, the transmission apparatus can transmit ACK/NACK information using a channel resource that is mapped to the first CCE of a PDCCH.

However, when there are two transmission antennas in step 722, the terminal transmits one ACK/NACK information using two CSs and two OCs, which are two channel resources, through two transmission antennas in step 726.

However, when there are four transmission antennas in step 722, the terminal transmits one ACK/NACK information using two CSs and two OCs, which are two channel resources, through the four transmission antennas in step 728. The ACKCH that has passed one channel resource is transmitted to two transmission antennas using the antenna selection method or the PVS method.

As illustrated in FIG. 7B, when the PDCCH includes two CCEs, a terminal can transmit one ACK/NACK information using two channel resources. However, a terminal having one transmission antenna transmits one ACK/NACK information using one CS and one OC through the single transmission antenna in the same manner as the existing LTE system. When there are two transmission antennas, one ACK/NACK information is transmitted using two CSs and two OCs, which are two channel resources, through two transmission antennas. Further, when there are four transmission antennas, one ACK/NACK information is transmitted using information that is generated using two CSs and two OCs, which are two channel resources and two channel resources, through the four transmission antennas according to the antenna selection method or the PVS method.

FIG. 7C is a flowchart of control according to one, two, or four transmission antennas in a terminal when the PDCCH includes four CCEs, according to an embodiment of the present invention.

Referring to FIG. 7C, when the number of CCEs included in the PDCCH is determined to be four at step 712 of FIG. 7A, the terminal checks a number of transmission antennas in step 732. When there is one transmission antennas in step 732, the transmission apparatus transmits one ACK/NACK information using one CS and one OC, which are one channel resource, through the one transmission antenna in the same manner as the existing LTE system in step 734. For example, the transmission apparatus can transmit ACK/NACK information using a channel resource that is mapped to the first CCE of a PDCCH.

However, when there are two transmission antennas in step 732, the terminal transmits one ACK/NACK information using two CSs and two OCs, which are two channel resources, through the two antennas in step 736.

When there are four transmission antennas in step 732, the terminal transmits one ACK/NACK information using four CSs and four OCs, which are four channel resources, through the four antennas in step 738. The ACKCH that has passed one channel resource is transmitted to two antennas using the antenna selection method or the PVS method.

As illustrated in FIG. 7C, when the PDCCH having four CCEs is used, the transmission apparatus can use four CSs and four OCs, which are four channel resources. When a terminal has one transmission antenna, one ACK/NACK information is transmitted using one CS and one OC, which are one channel resource, through the one transmission antenna in the same manner as the existing LTE system. When a terminal has two transmission antennas, as shown in the above Table 2, one ACK/NACK information is transmitted using two CSs and two OCs, which are two channel resources, through the two transmission antennas. Further, when a terminal has four transmission antennas, one ACK/NACK information is transmitted using four CSs and four OCs, which are four channel resources, through the four transmission antennas.

FIG. 7D is a flowchart of control according to one, two, or four transmission antennas in a terminal when the PDCCH includes eight CCEs, according to an embodiment of the present invention.

Referring to FIG. 7D, if eight CCEs are included in the PDCCH in step 712 of FIG. 7A, the terminal checks a number of transmission antennas in step 742. When there is one transmission antenna in step 742, the transmission apparatus transmits one ACK/NACK information using one CS and one OC, which are one channel resource, through the one transmission antenna in the same manner as the existing LTE system (744). For example, the transmission apparatus can transmit ACK/NACK information using a channel resource that is mapped to the first CCE of a PDCCH.

However, when there are two transmission antennas in step 742, the terminal transmits one ACK/NACK information using two CSs and two OCs, which are two channel resources, through two transmission antennas in step 746.

In addition, when there are four transmission antennas in step 742, the terminal transmits one ACK/NACK information using four CSs and four OCs, which are four channel resources, through the four antennas in step 748.

In an LTE-A system, a maximum limit of reverse-direction transmission antennas is set up to be four. Accordingly, as illustrated in FIG. 7D, when a PDCCH having eight CCEs is used, the transmission apparatus selects channel resources that will be used according to a number of transmission antenna among eight channel resources matched to eight CCEs. When there is one transmission antenna, one ACK/NACK information is transmitted using the channel resource matched to the first CCE through the one transmission antenna in the same manner as the existing LTE system. When there are two transmission antennas, as shown in the above Table 3, one ACK/NACK information is transmitted using two channel resources among eight channel resources through the two transmission antennas. When there are four transmission antennas, as shown in the above Table 4, one ACK/NACK information is transmitted by using four channel resources among eight channel resources through the four transmission antennas.

FIG. 8 is a diagram showing a configuration of a reception apparatus for receiving ACK/NACK information in a mobile communication system according to an embodiment of the present invention.

Referring to FIG. 8, the reception apparatus includes a plurality of reception modules 810, 820, 830, and 840, a controller 800, and a selector/combiner 850.

The reception modules 810, 820, 830, and 840 are equipped with, for example, four reception antennas, respectively. The first reception module 810 includes an RF reception unit 811, a CP eliminator 812, a FFT processing unit 813, a PUCCH reception unit 814, and a PUSCH reception unit 815. The RF reception unit 811 down-converts an RF signal received from an antenna into a baseband frequency, and converts the frequency-converted signal into digital data. The CP eliminator 812 eliminates a CP from the output of the RF reception unit 811. The FFT processing unit 813 performs FFT on the output of the CP eliminator 812 and outputs the FFT result. Furthermore, the PUCCH reception unit 814 generates ACK/NACK information by processing PUCCH data using a CS and an OC, which are corresponding channel resources. Each of the second reception modules 820 to fourth reception modules 840 has the same configuration as the first reception module 810, and generates ACK/NACK information using respective CS and OC, which are channel resources. Accordingly, a description of these reception modules will not be repeated.

The controller 800 generates a control signal for selecting and combining the first reception module 810 to fourth reception modules 840 by comparing and analyzing the number of CCEs of PDCCH and the number of transmission antennas of the transmission apparatus.

The selector/combiner 850 selects the output of the first reception module 810 to fourth reception modules 840 among a plurality of outputs or combines at least part of the outputs of the first reception module 810 to fourth reception modules 840 and outputs as final ACK/NACK information under the control of the controller 800.

The selector/combiner 850 assigns different channel resources to respective reception antennas. For example, when the number of CCEs is less than or equal to the number of transmission antennas, the selector/combiner 850 can select the same number of reception antennas as CCEs, and assign channel resources to the respective reception antennas. Further, if the number of CCEs exceeds the number of transmission antennas, the selector/combiner 850 can select as many channel resources as the number of transmission antennas, and assigns channel resources to the respective reception antennas.

As described above, each of the reception modules 810 to 840 frequency-converts and digital-converts the signals received from the plurality of reception antennas, removes CPs of the converted signal to perform a FFT process, and applies to the PUCCH reception unit 814 to generate ACK/NACK information. The PUCCH reception unit 814 of each of the reception modules, which use CSs and OCs, which are respective channel resources, generates ACK/NACK information of a corresponding reception module using the respective channel resources, and applies to the selector/combiner 850. Furthermore, the controller 800 that inputs information about the number of CCEs included in a PDCCH and the number of transmission antennas of a terminal generates a signal for controlling the selector/combiner 850 by analyzing the information. The selector/combiner 850 generates final ACK/NACK information by selecting and combining information generated using a plurality of channel resources in the first reception module 810 to fourth reception modules 840 in response to the control signal of the controller 800.

FIGS. 9A to 9D are flowcharts illustrating methods of receiving ACK/NACK information according to a number of CCEs of PDCCH and a number of transmission antennas, according to embodiments of the present invention.

Figure 9A:
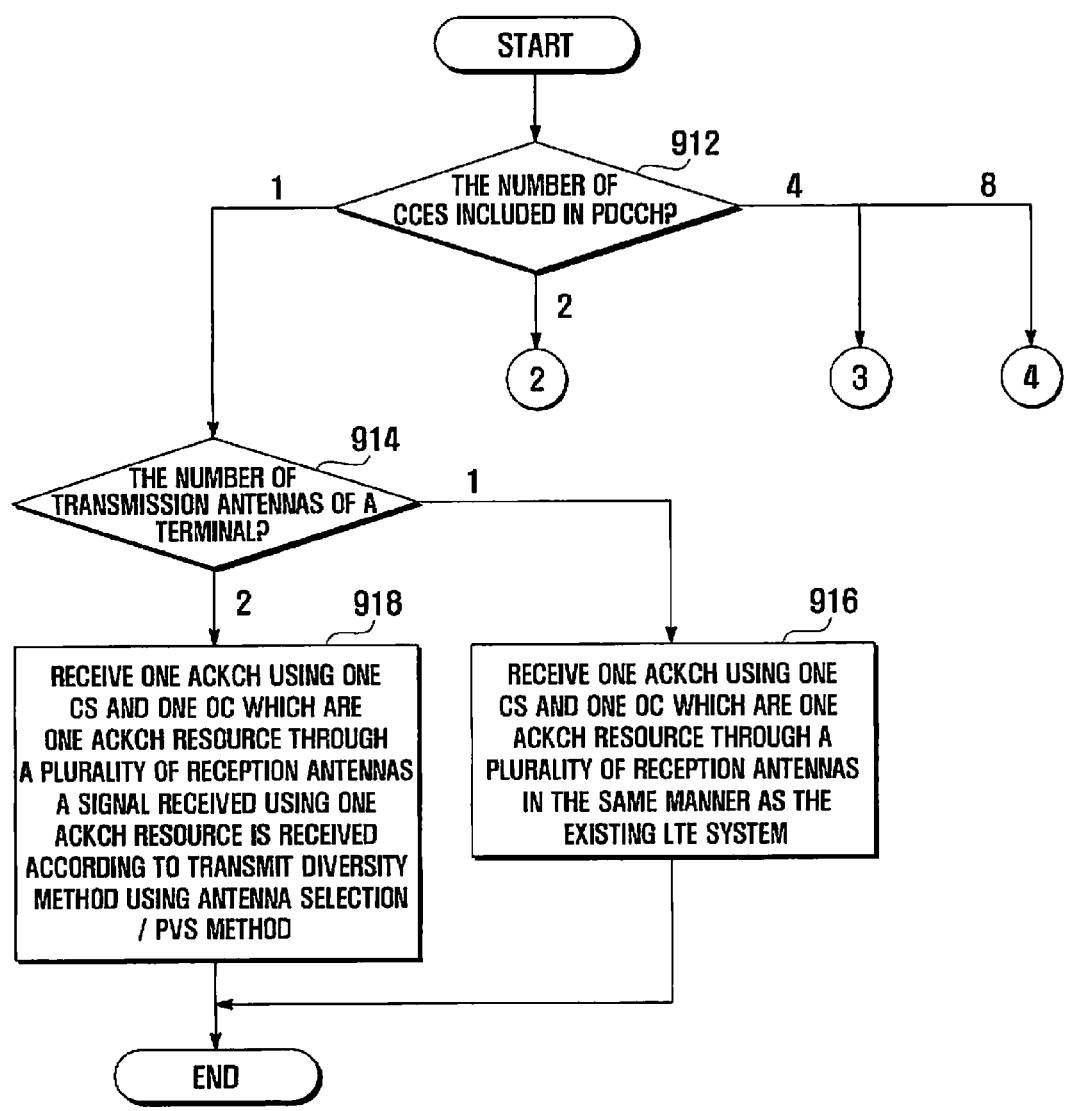
Figure 9B:
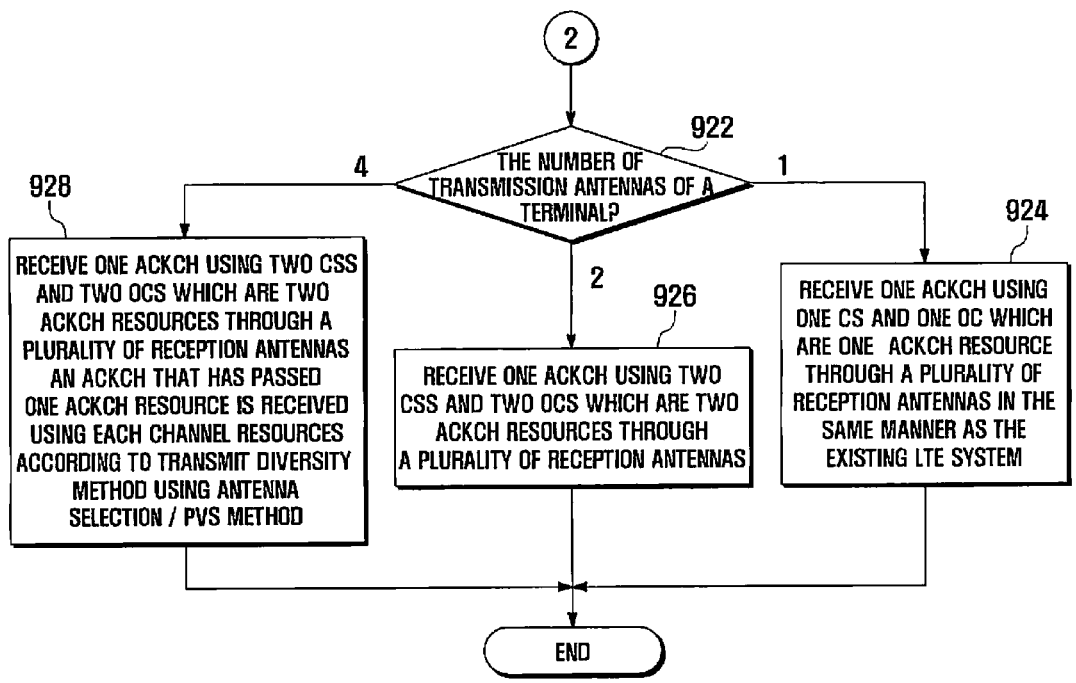
Figure 9C:
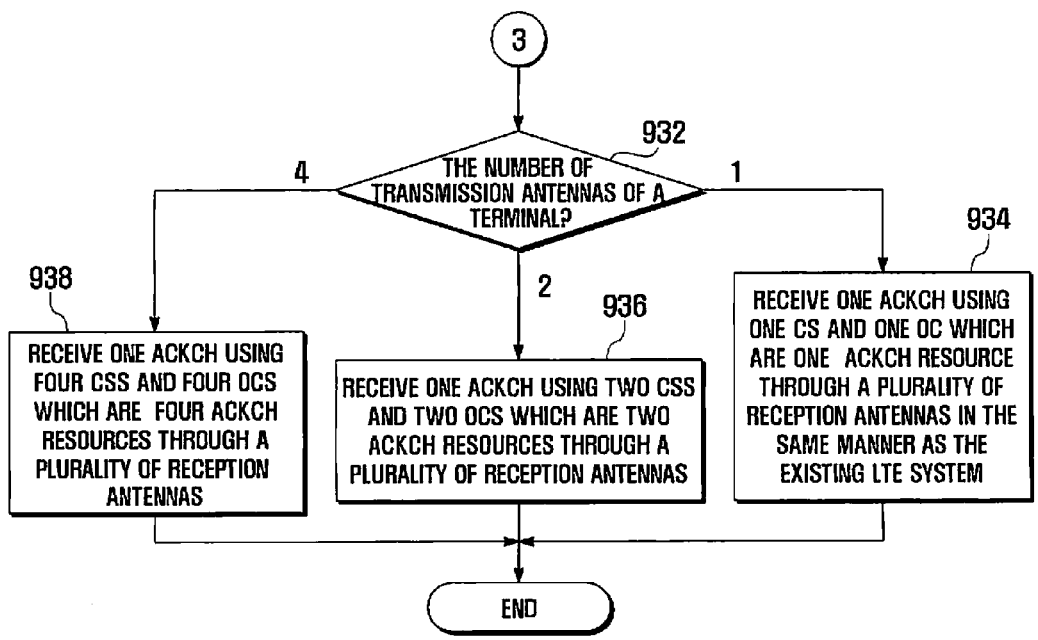

In FIGS. 9A to 9C, the reception apparatus checks the number of CCEs included in the PDCCH. When there is one CCE, a procedure as illustrated in FIG. 9A is performed. When there are two CCEs, a procedure as illustrated in FIG. 9B is performed. When there are four CCEs, a procedure as illustrated in FIG. 9C is performed. When there are eight CCEs, a procedure as illustrated in FIG. 9D is performed.

Referring to FIG. 9A, the reception apparatus checks the number of CCEs included in the PDCCH in step 912. When there is one CCE in step 912, the reception apparatus checks the number of transmission antennas of a terminal in step 914. When there is one transmission antenna in step 914, the reception apparatus receives one ACKCH using one CS and one OC, which are one channel resource, through a plurality of reception antennas in the same manner as the existing LTE system in step 916. When there are two transmission antennas in step 914, the reception apparatus receives one ACKCH using one CS and one OC, which are one channel resource through a plurality of reception antennas in step 918. The ACKCH that has passed one channel resource receives signals received using respective channel resources using the antenna selection method or the PVS method according to a transmit diversity method.

As described above, the method of receiving ACK/NACK information in the reception apparatus differs depending on an antenna transmission method of the transmission apparatus. When the transmission apparatus uses one transmission antenna, the reception apparatus receives one ACK/NACK information through a plurality of reception antennas using one CS and one OC, which are the same channel resource. When the transmission apparatus uses two transmission antennas, the reception apparatus receives one ACK/NACK information through a plurality of reception antennas using one CS and one OC, which are the same channel resource, according to the antenna selection method or the PVS method.

FIG. 9B is a flowchart of receiving ACK/NACK information of the reception apparatus, when the PDCCH includes two CCEs and a transmission apparatus includes one, two, or four transmission antennas, according to an embodiment of the present invention.

Referring to FIG. 9B, when there are two CCEs included in the PDCCH in step 912 of FIG. 9A, the base station checks the number of transmission antennas of the transmission apparatus in step 922.

When there is one transmission antenna in step 922, the reception apparatus receives one ACKCH through a plurality of reception antennas using one CS and one OC, which are one channel resource, in the same manner as the existing LTE system in step 924. For example, the reception apparatus can receive ACK/NACK information using a channel resource, which is mapped to the first CCE of the PDCCH.

When there are two transmission antennas in step 922, the reception apparatus receives one ACKCH through a plurality of reception antennas using two CSs and two OCs, which are two channel resources, in step 926.

When there are four transmission antennas in step 922, the reception apparatus receives one ACKCH through a plurality of reception antennas using two CSs and two OCs, which are two channel resources, in step 928. The ACKCH that has passed one channel resource receives signals using respective channel resources according to a transmit diversity method using the antenna selection method or the PVS method.

As illustrated in FIG. 9B, when the PDCCH includes two CCEs, the reception apparatus can receive one ACK/NACK information using two channel resources. When the transmission apparatus includes one transmission antenna, however, the reception apparatus receives one piece of ACK/NACK information through a plurality of reception antennas using one CS and one OC, which are one channel resource, in the same manner as the existing LTE system. When the transmission apparatus includes two transmission antennas, the reception apparatus receives one ACK/NACK information through a plurality of reception antennas using two CSs and two OCs, which are two channel resources. When the transmission apparatus includes four transmission antennas, the reception apparatus receives one ACK/NACK information through a plurality of reception antennas based on information, which is generated using two CSs and two OCs, which are two channel resources according to the antenna selection method or the PVS method.

FIG. 9C is a flowchart illustrating a control procedure of the reception apparatus when the PDCCH includes four CCEs and a transmission apparatus includes one, two, or four transmission antennas, according to an embodiment of the present invention.

Referring to FIG. 9C, when there are four CCEs included in the PDCCH in step 912 of FIG. 9A, the reception apparatus checks the number of transmission antennas of the transmission apparatus in step 932. When there is one transmission antenna in step 932, the reception apparatus receives one ACKCH through a plurality of reception antennas using one CS and one OC, which are one channel resource, in the same manner as the existing LTE system in step 934. For example, the reception apparatus can receive ACK/NACK information using a channel resource, which is mapped to the first CCE of the PDCCH.

When there are two transmission antennas in step 932, the reception apparatus receives one ACKCH through a plurality of reception antennas using two CSs and two OCs, which are two channel resources, in step 936.

When there are four transmission antennas in step 932, the reception apparatus receives one ACKCH through a plurality of reception antennas using four CSs and four OCs, which are four channel resources, in step 938.

As illustrated in FIG. 9C, when the PDCCH includes four CCEs, the reception apparatus can use four CSs and four OCs, which are four channel resources. In this case, when the transmission apparatus includes one transmission antenna, the reception apparatus receives one ACK/NACK information through a plurality of reception antennas using one CS and one OC, which are one channel resource, in the same manner as the existing LTE system. When the transmission apparatus includes two transmission antennas, as shown in the above Table 2, one ACK/NACK information is received through a plurality of reception antennas using two CSs and two OCs, which are two channel resources. When the transmission apparatus includes four transmission antennas, one ACK/NACK information is received through a plurality of reception antennas using four CSs and four OCs, which are four channel resources.

FIG. 9D is a flowchart illustrating a control procedure of the reception apparatus when the PDCCH includes eight CCEs and a transmission apparatus includes one, two, or four transmission antennas, according to an embodiment of the present invention.

Referring to FIG. 9D, when there are eight CCEs included in the PDCCH in step 912 of FIG. 9A, the reception apparatus checks the number of transmission antennas of the transmission apparatus in step 942. When there is one transmission antenna in step 942, the reception apparatus receives one ACKCH through a plurality of reception antennas using one CS and one OC, which are one channel resource, in the same manner as the existing LTE system in step 944. For example, the reception apparatus can receive ACK/NACK information using a channel resource, which is mapped to the first CCE of the PDCCH.

When there are two transmission antennas in step 942, the reception apparatus receives one ACKCH through a plurality of reception antennas using two CSs and two OCs, which are two channel resources, in step 946.

When there are four transmission antennas in step 942, the reception apparatus receives one ACKCH through a plurality of reception antennas using four CSs and four OCs, which are four channel resources, in step 948.

In the LTE-A system, the maximum limit of reverse-direction transmission antennas is set up to be four. Accordingly, as illustrated in FIG. 9D, when the PDCCH has eight CCEs, the reception apparatus selects channel resources that will be used according to the number of transmission antenna among eight channel resources matched to eight CCEs. When the transmission apparatus has one transmission antenna, the reception apparatus receives one ACK/NACK information through a plurality of transmission antennas using the channel resource matched to the first CCE in the same manner as the existing LTE system.

When the transmission apparatus uses two transmission antennas, as shown in the above Table 3, one ACK/NACK information is received through two transmission antennas using two channel resources among eight channel resources.

When the transmission apparatus uses four transmission antennas, as shown in the above Table 4, one ACK/NACK information is received through a plurality of reception antennas using four channel resources among eight channel resources.

Although embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method for transmitting an uplink ACKnowledgement CHannel (ACKCH) for a downlink data channel in a mobile communication system, the method comprising:
receiving a downlink control channel and a downlink data channel;
generating uplink acknowledgement information for the received downlink data channel;
identifying at least two channel resources for the uplink acknowledgement information; and
transmitting the uplink ACKCH including the uplink acknowledgement information on the channel resources through at least two transmission antennas,
wherein the channel resources comprise a first channel resource and a second channel resource, the first channel resource for a first transmission antenna is identified based on a lowest CCE index $n_{CCE}$ of the downlink control channel, and
the second channel resource for a second transmission antenna is identified based on a CCE index $n_{CCE}+1$.

2. The method of claim 1, wherein an n-th channel resource is identified based on a CCE index $n_{CCE}+n-1$.

3. The method of claim 1, wherein an n-th channel resource for an n-th antenna is identified based on a CCE index $n_{CCE}+n-1$.

4. The method of claim 1, further comprising:
performing, when a number of the at least two transmission antennas is greater than a number of the at least two channel resources, one of an antenna selection and a pre-coding.

5. The method of claim 1, wherein the first channel resource and the second channel resource comprise an Orthogonal Cover (OC) and Cyclic Shift (CS).

6. A method for receiving an uplink ACKnowledgement CHannel (ACKCH) for a downlink data channel from a transmission apparatus in a mobile communication system, the method comprising:
transmitting a downlink control channel and a downlink data channel to a User Equipment (UE);
receiving the uplink ACKCH on at least two channel resources from the UE; and
extracting uplink acknowledgement information for the downlink data channel from the uplink ACKCH,
wherein the channel resources comprise a first channel resource and a second channel resource, the first channel resource is identified to a first transmission antenna of the UE based on a lowest CCE index $n_{CCE}$ of the downlink control channel, and
the second channel resource is identified to a second transmission antenna of the UE based on a CCE index $n_{CCE}+1$.

7. The method of claim 6, wherein an n-th channel resource is identified based on a CCE index $n_{CCE}+n-1$.

8. The method of claim 6, wherein an n-th channel resource for an n-th antenna is identified based on a CCE index $n_{CCE}+n-1$.

9. The method of claim 6, wherein when a number of transmission antennas of the UE is greater than a number of the at least two channel resources, the UE performs one of an antenna selection and a pre-coding.

10. The method of claim 6, wherein the first channel resource and the second channel resource comprise an Orthogonal Cover (OC) and Cyclic Shift (CS).

11. An apparatus for transmitting an uplink ACKnowledgement CHannel (ACKCH) for a downlink data channel in a mobile communication system, the apparatus comprising:
a receiver module for receiving a downlink control channel and receiving a downlink data channel;
a controller for generating uplink acknowledgement information for the received downlink data channel;
a transmitter module for identifying at least two channel resources for the uplink acknowledgement information, and for transmitting the uplink ACKCH including the uplink acknowledgement information on the channel resources through at least two transmission antennas; and
a plurality of transmission antennas for transmitting the uplink acknowledgement information,
wherein the channel resources comprise a first channel resource and a second channel resource;
the first channel resource for a first transmission antenna is identified based on a lowest CCE index $n_{CCE}$ of the downlink control channel, and
the second channel resource for a second transmission antenna is identified based on a CCE index $n_{CCE}+1$.

12. The apparatus of claim 11, wherein an n-th channel resource is identified based on a CCE index $n_{CCE}+n-1$.

13. The apparatus of claim 11, wherein an n-th channel resource for an n-th antenna is identified based on a CCE index $n_{CCE}+n-1$.

14. The apparatus of claim 11, wherein the controller performs, when a number of the at least two transmission antennas is greater than a number of the at least two channel resources, one of an antenna selection and a pre-coding.

15. The apparatus of claim 11, wherein the first channel resource and the second channel resource comprise an Orthogonal Cover (OC) and Cyclic Shift (CS).

16. An apparatus for receiving an uplink ACKnowledgement CHannel (ACKCH) for a downlink data channel from a transmission apparatus in a mobile communication system using Orthogonal Frequency-Division Multiple Access (OFDMA), the apparatus comprising:
a transmitter module for transmitting a downlink control channel and a downlink data channel;
a reception module for receiving the uplink ACKCH on at least two channel resources; and
a controller for extracting uplink acknowledgement information for the downlink data channel from the uplink ACKCH,
wherein the channel resources comprise a first channel resource and a second channel resource, the first channel resource is identified to a first transmission antenna of a User Equipment (UE) based on a lowest CCE index $n_{CCE}$ of the downlink control channel, and
the second channel resource is identified to a second transmission antenna of the UE based on a CCE index $n_{CCE}+1$.

17. The apparatus of claim 16, wherein an n-th channel resource is identified based on a CCE index $n_{CCE}+n-1$.

18. The apparatus of claim 16, wherein an n-th channel resource for an n-th antenna is identified based on a CCE index $n_{CCE}+n-1$.

19. The apparatus of claim 16, wherein when a number of transmission antennas of the UE is greater than a number of the at least two channel resources, the UE performs one of an antenna selection and a pre-coding.

20. The apparatus of claim 16, wherein the first channel resource and the second channel resource comprise an Orthogonal Cover (OC) and Cyclic Shift (CS).

* * * * *